United States Patent
Papasakellariou et al.

(10) Patent No.: US 10,979,179 B2
(45) Date of Patent: *Apr. 13, 2021

(54) APPARATUS AND METHOD FOR TRANSMITTING ACKNOWLEDGEMENT INFORMATION IN A TDD COMMUNICATION SYSTEM

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/678,523

(22) Filed: Nov. 8, 2019

(65) Prior Publication Data

US 2020/0076540 A1 Mar. 5, 2020

Related U.S. Application Data

(63) Continuation of application No. 16/242,673, filed on Jan. 8, 2019, now Pat. No. 10,615,917, which is a
(Continued)

(51) Int. Cl.
*H04L 1/16* (2006.01)
*H04L 1/18* (2006.01)
*H04L 5/14* (2006.01)

(52) U.S. Cl.
CPC .......... *H04L 1/1614* (2013.01); *H04L 1/1621* (2013.01); *H04L 1/1861* (2013.01); *H04L 5/14* (2013.01)

(58) Field of Classification Search
CPC ... H04L 1/1614; H04L 1/1621; H04L 1/1861; H04L 5/14
See application file for complete search history.

(56) References Cited

U.S. PATENT DOCUMENTS 8,675,573 B2 3/2014 Montojo
2011/0055652 A1 3/2011 Park
(Continued)

FOREIGN PATENT DOCUMENTS

WO WO 2009/118621 10/2009
WO WO 2010/132006 11/2010

OTHER PUBLICATIONS

Panasonic, UL ACK/NACK transmission on PUCCH for carrier aggregation, May 2009, 3GPP, WG1 #57, 1-3.
(Continued)

*Primary Examiner* — Habte Mered
(74) *Attorney, Agent, or Firm* — The Farrell Law Firm, P.C.

(57) ABSTRACT

Methods and apparatuses are described for transmitting acknowledgement information in a communication system. A method includes receiving one or more data TBs in one or more downlink data channels over TTIs; generating acknowledgement information comprising four acknowledgement bits, jointly representing a state of reception results for the plurality of data TBs, if the UE is configured for reception of the downlink data channels from two cells, a number of the TTIs is three or four, and a number of the data TBs is greater than a number of the acknowledgement bits; generating acknowledgement information respectively representing a reception result for each data TB by a corresponding acknowledgement bit, if the UE is configured for reception of the downlink data channels from a single cell or two cells, and a number of the TTIs is one or two; encoding the acknowledgement bits; multiplexing the encoded acknowledgement bits with uplink data; and transmitting the multiplexed acknowledgement bits and the uplink data on an uplink data channel.

16 Claims, 11 Drawing Sheets

Related U.S. Application Data continuation of application No. 15/270,719, filed on Sep. 20, 2016, now Pat. No. 10,177,879, which is a continuation of application No. 13/451,152, filed on Apr. 19, 2012, now Pat. No. 9,450,709.

(60) Provisional application No. 61/476,975, filed on Apr. 19, 2011.

(56) References Cited

U.S. PATENT DOCUMENTS

| | | |
|---|---|---|
| 2011/0141878 A1 | 6/2011 | Che et al. |
| 2011/0243066 A1 | 10/2011 | Nayeb Nazar et al. |
| 2012/0039275 A1 | 2/2012 | Chen et al. |
| 2012/0044842 A1 | 2/2012 | Nammi |

OTHER PUBLICATIONS

3rd Generation Partnership Project; Technical Specification Group Radio Access Network; Evolved Universal Terrestrial Radio Access (E-UTRA); Multiplexing and Channel Coding (Release 10), 3GPP TS 36.212 V10.1.0, XP 050476522, Mar. 29, 2011.

3rd Generation Partnership Project; Technical Specification Group Radio Access Network; Evolved Universal Terrestrial Radio Access (E-UTRA); Physical Layer Procedures (Release 10), 3GPP TS 36.213 V10.1.0, XP 050476529, Mar. 30, 2011.

LG Electronics, "ACK/NACK Piggyback on PUSCH in TDD", R1-110369, 3GPP TSG RAN WG1 #63bis, Jan. 11, 2011.

CATT, "Remaining Issues for TDD ACK/NACK Transmission", R1-110705, 3GPP TSG RAN WG1 Meeting #64, Feb. 15, 2011.

Sharp, "Ordering of HARQ-ACK Bits for RM Coding", R1-110759, 3GPP TSG RAN WG1 Meeting #64, Feb. 15, 2011.

Samsung, "Resources for HARQ-ACK Multiplexing in PUSCH for DL CA", R1-110726, 3GPP TSG RAN WG1 #64, Feb. 15, 2011.

Panasonic, "UL ACK/NACK Transmission on PUCCH for Carrier Aggregation", R1-091744, 3GPP TSG-RAN WG1 Meeting #57, May 4, 2009.

LG Electronics, "ACK/NACK on PUCCH for TDD", R1-106099, 3GPP TSG RAN WG1 Meeting #63, Nov. 15, 2010.

LG Electronics, "ACK/NACK Transmission on PUSCH in TDD", R1-110879, 3GPP TSG RAN WG1 #64, Feb. 21-25, 2011, 6 pages.

Samsung, "Discussion on Channel Selection for TDD", R1-110519, 3GPP TSG RAN WG1 #63bis, Jan. 17-21, 2011, 8 pages.

Qualcomm Incorporated, "Details of DFT-S-OFDM", R1-104784, 3GPP TSG-RAN WG1 #62, Aug. 23-27, 2010, 5 pages.

Samsung, "HARQ-ACK Multiplexing in PUSCH for "Mode a" and "Mode b" • in TDD", R1-111454, 3GPPTSG RAN WG1 #65, May 9-13, 2011, 5 pages.

Huawei et al., "Determination of Pusch A/N Codebook Size for TDD", R1-112010, 3GPPTSG RAN WG1 Meeting #65, May 9-13, 2011, 13 pages.

Australian Examination Report dated Feb. 18, 2016 issued in counterpart application No. 2012246830, 4 pages.

Japanese Office Action dated Feb. 22, 2016 issued in counterpart application No. 2014-506329, 6 pages.

APPARATUS AND METHOD FOR TRANSMITTING ACKNOWLEDGEMENT INFORMATION IN A TDD COMMUNICATION SYSTEM

PRIORITY

The present application is Continuation of U.S. application Ser. No. 16/242,673, which was filed in the United States Patent and Trademark Office (USPTO) on Jan. 8, 2019, which is Continuation of U.S. application Ser. No. 15/270,719, which was filed in the USPTO on Sep. 20, 2016, issued as U.S. Pat. No. 10,177,879 on Jan. 8, 2019, which is Continuation of U.S. application Ser. No. 13/451,152, which was filed in the USPTO on Apr. 19, 2012, issued as U.S. Pat. No. 9,450,709 on Sep. 20, 2016, and claims priority under 35 U.S.C. § 119(e) to U.S. Provisional Application No. 61/476,975, which was filed in the USPTO on Apr. 19, 2011, the entire disclosure of each of which is incorporated herein by reference.

BACKGROUND OF THE INVENTION

1. Field of the Invention

The present invention relates generally to wireless communication systems, and more particularly, to the transmission of acknowledgement information in an uplink of a communication system.

2. Description of the Art

A communication system includes a DownLink (DL) that conveys transmission signals from a Base Station (BS or NodeB) to User Equipments (UEs) and an UpLink (UL) that conveys transmission signals from UEs to the NodeB.

More specifically, a UL conveys transmissions of data signals carrying information content, transmissions of control signals providing control information associated with transmissions of data signals in a DL, and transmissions of Reference Signals (RSs), which are commonly referred to as pilot signals. A DL also conveys transmissions of data signals, control signals, and RSs. UL signals may be transmitted over clusters of contiguous REs using a Discrete Fourier Transform Spread Orthogonal Frequency Division Multiplexing (DFT-S-OFDM) method. DL signals may be transmitted using an OFDM method.

UL data signals are conveyed through a Physical Uplink Shared CHannel (PUSCH) and DL data signals are conveyed through a Physical Downlink Shared CHannel (PDSCH).

In the absence of a PUSCH transmission, a UE conveys UL Control Information (UCI) through a Physical Uplink Control CHannel (PUCCH). However, when a UE has a PUSCH transmission, it may convey UCI with data through the PUSCH.

DL control signals may be broadcast or sent in a UE-specific nature. Accordingly, UE-specific control channels can be used, among other purposes, to provide UEs with Scheduling Assignments (SAs) for PDSCH reception (DL SAs) or PUSCH transmission (UL SAs). The SAs are transmitted from the NodeB to respective UEs using DL Control Information (DCI) formats through respective Physical DL Control CHannels (PDCCHs).

The NodeB may configure a UE through higher layer signaling, such as Radio Resource Control (RRC) signaling, a PDSCH, and a PUSCH Transmission Mode (TM). The PDSCH TM or PUSCH TM is respectively associated with a DL SA or a UL SA, and defines whether the respective PDSCH or PUSCH conveys one data Transport Block (TB) or two data TBs.

PDSCH or PUSCH transmissions are either scheduled to a UE by a NodeB through higher layer signaling or through physical layer signaling (e.g., a PDCCH) using a respective DL SA or UL SA, or correspond to non-adaptive retransmissions for a given Hybrid Automatic Repeat reQuest (HARQ) process. Scheduling by higher layer signaling is referred to as Semi-Persistent Scheduling (SPS), and scheduling by a PDCCH is referred to as dynamic. A PDCCH may also be used to release an SPS PDSCH. If a UE fails to detect a PDCCH, this event is referred to as Discontinuous Transmission (DTX).

The UCI includes ACKnowledgment (ACK) information associated with a HARQ process (HARQ-ACK). The HARQ-ACK information may include multiple bits indicating the correct or incorrect detection of multiple data TBs. Typically, a correct detection of a data TB is indicated by a positive acknowledgment (i.e., an ACK) while an incorrect detection is indicated by a Negative ACK (NACK). If a UE misses (e.g., fails to detect) a PDCCH, it may explicitly or implicitly (absence of a signal transmission) indicate DTX (tri-state HARQ-ACK information) or both a DTX and an incorrect reception of a TB can be represented by a NACK (in a combined NACK/DTX state).

In Time Division Duplex (TDD) systems, DL and UL transmissions occur in different Transmission Time Intervals (TTIs), which are referred to as subframes. For example, in a frame including 10 subframes, some the subframes may be used for DL transmissions and some may be used for UL transmissions.

If a PDSCH conveys one data TB, respective HARQ-ACK information typically consists of one bit that is encoded as a binary '1', if the TB is correctly received (i.e., an ACK value), and as a binary '0', if the TB is incorrectly received (i.e., a NACK value). If a PDSCH conveys two data TBs, in accordance with a Single-User Multiple Input Multiple Output (SU-MIMO) transmission method, respective HARQ-ACK information typically consists of two bits $[o_0^{ACK}\ o_1^{ACK}]$ with $o_0^{ACK}$ or for a first TB and $o_1^{ACK}$ for a second TB.

FIG. 1 illustrates a conventional TTI for a PUSCH or a PUCCH.

Referring to FIG. 1, a TTI consists of one subframe including two slots for PUSCH 110A or PUCCH 110B transmission. Each slot 120A and 120B includes $N_{symb}^{UL}$ symbols 130A used for signaling data or HARQ-ACK information in a PUSCH, or $N_{symb}^{UL}$ symbols 130B used for HARQ-ACK information in a PUCCH, and Reference Signals (RS) 140A or 140B, which are used for channel estimation and coherent demodulation of received data or HARQ-ACK information. The transmission BandWidth (BW) consists of frequency resource units that are referred to as Physical Resource Blocks (PRBs). Each PRB consists of $N_{sc}^{RB}$ sub-carriers, or Resource Elements (REs). For PUSCH transmission, a UE is allocated $M_{PUSCH}$ PRBs for a total of $M_{sc}^{PUSCH} = M_{PUSCH} \cdot N_{sc}^{RB}$ REs 150A. For PUCCH transmission, a UE is allocated 1 PRB 150B, which may be in two different BW locations in each of the two subframe slots.

FIG. 2 illustrates a conventional HARQ-ACK transmission structure in a PUCCH subframe slot.

Referring to FIG. 2, HARQ-ACK bits b 210 modulate 220 a Constant Amplitude Zero Auto-Correlation (CAZAC) sequence 230, for example, using Binary Phase Shift Keying (BPSK) with b=b_0 or Quaternary Phase Shift Keying (QPSK) with b=(b_0, b_1). The modulated CAZAC sequence is then transmitted after performing an Inverse Fast Frequency Transform (IFFT) 240. The RS is transmitted through a non-modulated CAZAC sequence after performing an IFFT 250.

FIG. 3 is a block diagram illustrating of a conventional transmitter for a PUCCH.

Referring to FIG. 3, a CAZAC sequence 310 can be used without modulation for an RS or with modulation for HARQ-ACK information. The transmitter in the FIG. 3 includes a selector 320, a sub-carrier mapper 330, an IFFT unit 340, a Cyclic Shifter 350, a Cyclic Prefix (CP) inserter 360, and a filter 370 for time windowing. For sub-carrier mapping in the sub-carrier mapper 330, the selector 320 selects a first PRB and a second PRB for transmission of the CAZAC sequence in a first slot and a second slot, respectively. Subsequently, the IFFT unit 340 performs IFFT, and the Cyclic Shifter 350 applies a Cyclic Shift (CS) to the output of the IFFT unit 340. A CP and filtering are applied by the CP inserter 360 and the filter 370. Thereafter, the signal 380 is transmitted. Additional transmitter circuitry such as a Digital-to-Analog Converter (DAC), analog filters, amplifiers, transmitter antennas, etc., are not shown for brevity.

FIG. 4 is a block diagram illustrating a conventional receiver diagram for a PUCCH.

Referring to FIG. 4, the receiver includes a filter 420 for time windowing, a CP remover 430, a CS restorer 440, a Fast Fourier Transform (FFT) unit 450, a sub-carrier demapper 460, a selector 465, and a multiplier 470. An antenna (not shown) receives an analog signal and after further processing units (such as filters, amplifiers, frequency down-converters, and Analog-to-Digital Converters (ADCs) that are not shown for brevity), a digital received signal 410 passes through the filter 420 and the CP remover 430. Subsequently, a CS is restored by the CS restorer 440, the FFT 450 unit applies FFT, for sub-carrier demapping in the sub-carrier demapper 460, a selector 465 selects REs in a first PRB and a second PRB in a first slot and in a second slot, respectively, and a multiplier correlates 470 the REs with a replica of a CAZAC sequence 480. The output 490 may then be passed to a channel estimation unit, such as a time-frequency interpolator, when a subframe symbol conveys a RS, or to a detection unit, when a subframe symbol conveys a HARQ-ACK signal.

Different CSs of a same CAZAC sequence provide orthogonal CAZAC sequences and can be allocated to different UEs to achieve orthogonal multiplexing of HARQ-ACK signal transmissions in the same PRB. If $T_s$ is a symbol duration, the number of such CSs is approximately $\lfloor T_s/D \rfloor$, where D is a channel propagation delay spread and $\lfloor \ \rfloor$ is a floor function that rounds a number to its immediately lower integer.

In addition to orthogonal multiplexing of HARQ-ACK signals and an RS in a same PRB using different CS of a CAZAC sequence, orthogonal multiplexing may also be in the time domain using Orthogonal Covering Codes (OCC). For example, in FIG. 2, a HARQ-ACK signal can be modulated by a length-4 OCC, such as a Walsh-Hadamard (WH) OCC, while an RS can be modulated by a length-3 OCC, such as a DFT OCC (not shown). When using an OCC, the multiplexing capacity per PRB increases by a factor of 3 (determined by the OCC with the smaller length). The sets of WH OCCs $\{W_0, W_1, W_2, W_3\}$, and DFT OCCs $\{D_0, D_2, D_3\}$, are respectively $$\begin{bmatrix} W_0 \\ W_1 \\ W_2 \\ W_3 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \text{ and } \begin{bmatrix} D_0 \\ D_1 \\ D_2 \end{bmatrix} = \begin{bmatrix} 1 & 1 & 1 \\ 1 & e^{-j2\pi/3} & e^{-j4\pi/3} \\ 1 & e^{-j4\pi/3} & e^{-j2\pi/3} \end{bmatrix}.$$

Table 1 presents a mapping for a PUCCH resource $n_{PUCCH}$ used for a HARQ-ACK signal and an RS transmission to an OCC $n_{oc}$ and a CS α, assuming 6 CS per symbol and a length-3 OCC (with 3 CS used for each OCC). If all resources within a PUCCH PRB are used, resources in an immediately next PRB can be used.

TABLE 1

PUCCH Resource Mapping to OCC and CS.

| | OCC $n_{oc}$ for a HARQ-ACK and for an RS | | |
|---|---|---|---|
| CS α | $W_0, D_0$ | $W_1, D_1$ | $W_3, D_2$ |
| 0 | $n_{PUCCH} = 0$ | | $n_{PUCCH} = 6$ |
| 1 | | $n_{PUCCH} = 3$ | |
| 2 | $n_{PUCCH} = 1$ | | $n_{PUCCH} = 7$ |
| 3 | | $n_{PUCCH} = 4$ | |
| 4 | $n_{PUCCH} = 2$ | | $n_{PUCCH} = 8$ |
| 5 | | $n_{PUCCH} = 5$ | |

A PDCCH is transmitted in elementary units that are referred to as Control Channel Elements (CCEs). Each CCE may consist of 36 REs. UEs are informed of a total number of CCEs, $N_{CCE}$, through a transmission of a Physical Control Format Indicator CHannel (PCFICH) by a serving NodeB. The PCFICH indicates a number of OFDM symbols used for PDCCH transmissions in a respective DL subframe. A one-to-one mapping can exist between PUCCH resources (PRB, CS, OCC) for HARQ-ACK signal transmission and PDCCH CCEs. For example, if a single PUCCH resource is used for HARQ-ACK signal transmission, it may be derived from the CCE with the lowest index in a PDCCH conveying a respective DL SA.

In TDD systems, DL and UL transmissions occur in different subframes and M≥1 DL subframes may be associated with a single UL subframe. The association is in the sense that HARQ-ACK information generated in response to reception of data TBs in M≥1 DL subframes is transmitted in a single UL subframe. This set of M≥1 DL subframes is commonly referred to as a bundling window. Denoting a DL subframe index by m=0, 1, . . . , M−1, a number of CCEs for a PCFICH value of p ($N_0$=0) by $N_p$, and a first PDCCH CCE of a DL SA in subframe m by $n_{CCE}$(m), a PUCCH resource indexing for HARQ-ACK signal transmission can be as described below.

A UE first selects a value p∈{0, 1, 2, 3} providing $N_p \le n_{CCE}(m) < N_{p+1}$, and then considers $n_{PUCCH,m}$=(M−m−1)×$N_p$+m×$N_{p+1}$+$n_{CCE}$(m)+$N_{PUCCH}$ as a PUCCH resource available for HARQ-ACK signal transmission in response to a DL SA in DL subframe m, where $N_p$=max{0,$\lfloor [N_{RB}^{DL} \times (N_{sc}^{RB} \times p-4)]/36 \rfloor$}, $N_{PUCCH}$ is an offset informed to a UE by higher layer signaling, $N_{sc}^{RB}$ is a number of sub-carriers and $N_{RB}^{DL}$ is a number of PRBs in the DL operating BW.

HARQ-ACK information in a PUCCH may be conveyed with several methods including HARQ-ACK time-domain bundling and HARQ-ACK multiplexing using channel selection (referring to a selection of a PUCCH resource from a set of available PUCCH resources). In both cases, HARQ-ACK spatial-domain bundling applies where a UE generates an ACK, only if it receives all data TBs in a PDSCH correctly, and generates a NACK otherwise.

With HARQ-ACK time-domain bundling, a UE generates an ACK, only if it receives all TBs in a bundling window correctly, and generates a NACK otherwise. Therefore, HARQ-ACK time-domain bundling results in unnecessary retransmissions as a NACK is sent even when the UE correctly receives some of the TBs in a bundling window.

With HARQ-ACK multiplexing using channel selection, a UE conveys HARQ-ACK information for each DL subframe in a bundling window by selecting a PUCCH resource from a set of possible resources and by modulating the HARQ-ACK signal using QPSK modulation.

Table 2 describes HARQ-ACK multiplexing using channel selection for M=3 in a TDD system with a single DL cell and a single UL cell. Specifically, a UE modulates a HARQ-ACK signal using the QPSK constellation point and selects one of PUCCH resources $n_{PUCCH}(0)$, $n_{PUCCH}(1)$, or $n_{PUCCH}(2)$, which are respectively determined by a first CCE of a respective PDCCH conveying a DL SA in a respective first, second, or third DL subframe (if any).

Explicit DTX indication is possible by including a Downlink Assignment Index (DAI) Information Element (IE), which indicates an accumulative number of PDSCH transmission(s) to a UE (the DAI IE is a counter within a bundling window), in DCI formats conveying DL SAs.

TABLE 2

HARQ-ACK Multiplexing with Channel Selection for M = 3 DL Subframes

| Entry Number | HARQ-ACK(0), HARQ-ACK(1), HARQ-ACK(2) | $n_{PUCCH}$ | Constellation |
|---|---|---|---|
| 1 | ACK, ACK, ACK | $n_{PUCCH,2}$ | 1, 1 |
| 2 | ACK, ACK, NACK/DTX | $n_{PUCCH,1}$ | 1, 1 |
| 3 | ACK, NACK/DTX, ACK | $n_{PUCCH,0}$ | 1, 1 |
| 4 | ACK, NACK/DTX, NACK/DTX | $n_{PUCCH,0}$ | 0, 1 |
| 5 | NACK/DTX, ACK, ACK | $n_{PUCCH,2}$ | 1, 0 |
| 6 | NACK/DTX, ACK, NACK/DTX | $n_{PUCCH,1}$ | 0, 0 |
| 7 | NACK/DTX, NACK/DTX, ACK | $n_{PUCCH,2}$ | 0, 0 |
| 8 | DTX, DTX, NACK | $n_{PUCCH,2}$ | 0, 1 |
| 9 | DTX, NACK, NACK/DTX | $n_{PUCCH,1}$ | 1, 0 |
| 10 | NACK, NACK/DTX, NACK/DTX | $n_{PUCCH,0}$ | 1, 0 |
| 11 | DTX, DTX, DTX | N/A | N/A |

When HARQ-ACK information is transmitted in a PUSCH, it is encoded depending on a number of HARQ-ACK bits being conveyed. Assuming HARQ-ACK spatial-domain bundling, each HARQ-ACK bit conveys an outcome of each PDSCH reception and is encoded as a binary '1', if the respective TB(s) are correctly received (i.e., an ACK), and is encoded as a binary '0', if the respective TB(s) are incorrectly received (i.e., a NACK). Therefore, an individual HARQ-ACK bit is conveyed for each PDSCH reception. When HARQ-ACK information consists of O=1 bit $o_0^{ACK}$, it is encoded using repetition coding. When HARQ-ACK information consists of O=2 bits $[o_0^{ACK}\ o_1^{ACK}]$, it is encoded using a (3, 2) simplex code, as described in Table 3 for $Q_m$ data modulation bits, where $o_2^{ACK}=(o_0^{ACK}+o_1^{ACK})$ mod 2.

TABLE 3

Encoding for 1 and 2 HARQ-ACK Information Bits.

| $Q_m$ | Encoded HARQ-ACK - 1 bit | Encoded HARQ-ACK - 2 bits |
|---|---|---|
| 2 | $[o_0^{ACK}\ y]$ | $[o_0^{ACK}\ o_1^{ACK}\ o_2^{ACK}\ o_0^{ACK}\ o_1^{ACK}\ o_2^{ACK}]$ |
| 4 | $[o_0^{ACK}\ y\ x\ x]$ | $[o_0^{ACK}\ o_1^{ACK}\ X\ X\ o_2^{ACK}\ o_0^{ACK}\ X\ X\ o_1^{ACK}\ o_2^{ACK}\ X\ X]$ |
| 6 | $[o_0^{ACK}\ y\ x\ x\ x\ x]$ | $[o_0^{ACK}\ o_1^{ACK}\ x\ x\ x\ x\ o_2^{ACK}\ o_0^{ACK}\ x\ x\ x\ x\ o_1^{ACK}\ o_2^{ACK}\ x\ x\ x\ x]$ |

When HARQ-ACK information corresponds to a possible reception of more than 2 PDSCHs (assuming HARQ-ACK spatial-domain bundling) and consists of respective $3 \leq O^{ACK} \leq 11$ bits, the coding may be by a $(32, O^{ACK})$ Reed-Mueller (RM) block code. Denoting the HARQ-ACK information bits by or $o_0^{ACK}\ o_1^{ACK}, \ldots, o_{O^{ACK}-1}^{ACK}$ and the encoded HARQ-ACK bits by $\tilde{q}_0^{ACK}\ \tilde{q}_1^{ACK}, \ldots, \tilde{q}_{31}^{ACK}$, $$\tilde{q}_i^{ACK} = \sum_{n=0}^{O-1}(o_n^{ACK} \cdot M_{i,n}) \mathrm{mod} 2,$$

where $M_{i,n}$ are basis sequences of an RM code and i=0, 1, ..., 31. The output bit sequence $q_0^{ACK}, q_1^{ACK}, q_2^{ACK}, \ldots, q_{Q_{ACK}-1}^{ACK}$ is obtained by a circular repetition of the bit sequence $\tilde{q}_0^{ACK}\ \tilde{q}_1^{ACK}, \ldots, \tilde{q}_{31}^{ACK}$ such that the bit sequence length is equal to $Q_{ACK}$, which is the total number of coded HARQ-ACK symbols in a PUSCH.

FIG. 5 is a block diagram illustrating a conventional transmitter for data and HARQ-ACK in a PUSCH.

Referring to FIG. 5, the transmitter includes a data encoder 515, an RM encoder 520, a puncturer/inserter 530, a DFT unit 540, a sub-carrier mapper 550, a selector 555, an IFFT unit 560, a CP inserter 570, and a filter 580 for time windowing. Data information bits 505 and HARQ-ACK information bits 510 are respectively provided to the data encoder 515 and the RM encoder 520. For two HARQ-ACK information bits, a simplex encoder is used instead of the RM encoder 520. Encoded data bits are subsequently punctured and replaced by encoded HARQ-ACK bits by the puncturer/inserter 530. The result is then input to a DFT unit 540. A selector 555 selects REs corresponding to the PUSCH transmission BW for subcarrier mapping in the sub-carrier mapper 550, which are then input to the IFFT unit 560. A CP is inserted by the CP inserter 570, and the CP inserted signal then passes through the filter 580 before being transmitted 590. Again, additional transmitter circuitry is not illustrated for conciseness. Also, the modulation process for the transmitted bits is omitted for brevity.

FIG. 6 is a conventional block diagram illustrating a receiver block for data and HARQ-ACK in a PUSCH.

Referring to FIG. 6, the receiver includes a filter 620 for time windowing, a CP remover 630, an FFT unit 640, a sub-carrier de-mapper 650, a selector 655, an Inverse DFT (IDFT) unit 660, a de-multiplexer 670, a data decoder 680, and an RM decoder 685. After an antenna (not shown) receives a Radio-Frequency (RF) analog signal and further processing units (not shown) convert the analog signal to a digital signal 610, the digital signal 610 passes through the filter 620 and the CP removal unit 630. The output of the CP removal unit 630 is provided to the FFT unit 640, and a selector 655 controls the sub-carrier de-mapper 650 to select the REs used by the transmitter. The obtained values are provided to the IDFT unit 660 and the de-multiplexer 670, which outputs coded data bits. that the coded data bits are then provided to the data decoder 680 and the coded HARQ-ACK bits are then provided to the RM decoder 685 to respectively output data information bits 690 and HARQ-ACK information bits 695. For two HARQ-ACK information bits, a simplex decoder is used instead of the RM decoder 685. Similar to the transmitter illustrated in FIG. 5, receiver functionalities such as channel estimation, demodulation, and decoding are not illustrated in FIG. 6 for brevity.

In order to increase the supportable data rates to a UE, a NodeB can configure multiple cells to a UE in both a DL and a UL to effectively provide higher operating BWs. For example, to support communication over 40 MHz, two 20 MHz cells can be configured to a UE. A UE is always configured a DL cell and a UL cell to maintain communication and each such cell is referred to as Primary cell (Pcell). Additional cells a UE may be configured are referred to as Secondary cells (Scells).

A transmission of HARQ-ACK information can be in a PUCCH of the UL Pcell. For HARQ-ACK multiplexing using channel selection, a separate PUCCH resource is assigned in a UL Pcell for HARQ-ACK signal transmission in response to a PDSCH reception in each subframe of a bundling window and each DL cell.

For two configured cells and a bundling window size of M>1 DL subframes, denoting PUCCH resources associated with reception of PDSCH(s) on the DL Pcell by $n_{PUCCH,0}$ and $n_{PUCCH,1}$ and PUCCH resources associated with reception of PDSCH(s) on the Scell and by HARQ-ACK(j), $0 \leq j \leq M-1$, by $n_{PUCCH,2}$ and $n_{PUCCH,3}$ the ACK/NACK/DTX response for a PDSCH with corresponding DAI value in a PDCCH equal to 'j+1', a UE performs channel selection according to Table 4 for M=3 and Table 5 for M=4 and transmits a HARQ-ACK signal using QPSK modulation {b(0),b(1)} on PUCCH resource $n_{PUCCH}$. For the last state in Table 4 and the last two states in Table 5, there is no transmission in a PUCCH, as a UE cannot determine a valid PUCCH resource. The value 'any' can be either 'ACK' or 'NACK/DTX'.

TABLE 4

HARQ-ACK Multiplexing with Channel Selection for M = 3 DL Subframes and 2 Configured Cells.

| Primary Cell | Secondary Cell | Resource | Constellation |
| --- | --- | --- | --- |
| HARQ-ACK(0), HARQ-ACK(1), HARQ-ACK(2) | HARQ-ACK(0), HARQ-ACK(1), HARQ-ACK(2) | $n_{PUCCH}$ | b(0), b(1) |
| ACK, ACK, ACK | ACK, ACK, ACK | $n_{PUCCH,1}$ | 1, 1 |
| ACK, ACK, NACK/DTX | ACK, ACK, ACK | $n_{PUCCH,1}$ | 0, 0 |
| ACK, NACK/DTX, any | ACK, ACK, ACK | $n_{PUCCH,3}$ | 1, 1 |
| NACK/DTX, any, any | ACK, ACK, ACK | $n_{PUCCH,3}$ | 0, 1 |
| ACK, ACK, ACK | ACK, ACK, NACK/DTX | $n_{PUCCH,0}$ | 1, 0 |
| ACK, ACK, NACK/DTX | ACK, ACK, NACK/DTX | $n_{PUCCH,3}$ | 1, 0 |
| ACK, NACK/DTX, any | ACK, ACK, NACK/DTX | $n_{PUCCH,0}$ | 0, 1 |
| NACK/DTX, any, any | ACK, ACK, NACK/DTX | $n_{PUCCH,3}$ | 0, 0 |
| ACK, ACK, ACK | ACK, NACK/DTX, any | $n_{PUCCH,2}$ | 1, 1 |
| ACK, ACK, NACK/DTX | ACK, NACK/DTX, any | $n_{PUCCH,2}$ | 0, 1 |
| ACK, NACK/DTX, any | ACK, NACK/DTX, any | $n_{PUCCH,2}$ | 1, 0 |
| NACK/DTX, any, any | ACK, NACK/DTX, any | $n_{PUCCH,2}$ | 0, 0 |
| ACK, ACK, ACK | NACK/DTX, any, any | $n_{PUCCH,1}$ | 1, 0 |
| ACK, ACK, NACK/DTX | NACK/DTX, any, any | $n_{PUCCH,1}$ | 0, 1 |
| ACK, NACK/DTX, any | NACK/DTX, any, any | $n_{PUCCH,0}$ | 1, 1 |
| NACK, any, any | NACK/DTX, any, any | $n_{PUCCH,0}$ | 0, 0 |
| DTX, any, any | NACK/DTX, any, any | No Transmission | |

TABLE 5

HARQ-ACK Multiplexing with Channel Selection for M = 4 DL Subframes and 2 Configured Cells.

| Primary Cell | Secondary Cell | Resource | Constellation |
| --- | --- | --- | --- |
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n_{PUCCH}$ | b(0), b(1) |
| ACK, ACK, ACK, NACK/DTX | ACK, ACK, ACK, NACK/DTX | $n_{PUCCH,1}$ | 1, 1 |
| ACK, ACK, NACK/DTX, any | ACK, ACK, ACK, NACK/DTX | $n_{PUCCH,1}$ | 0, 0 |
| ACK, DTX, DTX, DTX | ACK, ACK, ACK, NACK/DTX | $n_{PUCCH,3}$ | 1, 1 |
| ACK, ACK, ACK, ACK | ACK, ACK, ACK, NACK/DTX | $n_{PUCCH,3}$ | 1, 1 |
| NACK/DTX, any, any, any | ACK, ACK, ACK, NACK/DTX | $n_{PUCCH,3}$ | 0, 1 |
| {ACK, NACK/DTX, any, any}, except for {ACK, DTX, DTX, DTX} | ACK, ACK, ACK, NACK/DTX | $n_{PUCCH,3}$ | 0, 1 |
| ACK, ACK, ACK, NACK/DTX | ACK, ACK, NACK/DTX, any | $n_{PUCCH,0}$ | 1, 0 |

TABLE 5-continued

HARQ-ACK Multiplexing with Channel Selection for
M = 4 DL Subframes and 2 Configured Cells.

| Primary Cell | Secondary Cell | Resource | Constellation |
|---|---|---|---|
| ACK, ACK, NACK/DTX, any | ACK, ACK, NACK/DTX, any | $n_{PUCCH,3}$ | 1, 0 |
| ACK, DTX, DTX, DTX | ACK, ACK, NACK/DTX, any | $n_{PUCCH,0}$ | 0, 1 |
| ACK, ACK, ACK, ACK | ACK, ACK, NACK/DTX, any | $n_{PUCCH,0}$ | 0, 1 |
| NACK/DTX, any, any, any | ACK, ACK, NACK/DTX, any | $n_{PUCCH,3}$ | 0, 0 |
| {ACK, NACK/DTX, any, any}, except for {ACK, DTX, DTX, DTX} | ACK, ACK, NACK/DTX, any | $n_{PUCCH,3}$ | 0, 0 |
| ACK, ACK, ACK, NACK/DTX | ACK, DTX, DTX, DTX | $n_{PUCCH,2}$ | 1, 1 |
| ACK, ACK, ACK, NACK/DTX | ACK, ACK, ACK, ACK | $n_{PUCCH,2}$ | 1, 1 |
| ACK, ACK, NACK/DTX, any | ACK, DTX, DTX, DTX | $n_{PUCCH,2}$ | 0, 1 |
| ACK, ACK, NACK/DTX, any | ACK, ACK, ACK, ACK | $n_{PUCCH,2}$ | 0, 1 |
| ACK, DTX, DTX, DTX | ACK, DTX, DTX, DTX | $n_{PUCCH,2}$ | 1, 0 |
| ACK, DTX, DTX, DTX | ACK, ACK, ACK, ACK | $n_{PUCCH,2}$ | 1, 0 |
| ACK, ACK, ACK, ACK | ACK, DTX, DTX, DTX | $n_{PUCCH,2}$ | 1, 0 |
| ACK, ACK, ACK, ACK | ACK, ACK, ACK, ACK | $n_{PUCCH,2}$ | 1, 0 |
| NACK/DTX, any, any, any | ACK, DTX, DTX, DTX | $n_{PUCCH,2}$ | 0, 0 |
| NACK/DTX, any, any, any | ACK, ACK, ACK, ACK | $n_{PUCCH,2}$ | 0, 0 |
| {ACK, NACK/DTX, any, any}, except for {ACK, DTX, DTX, DTX} | ACK, DTX, DTX, DTX | $n_{PUCCH,2}$ | 0, 0 |
| {ACK, NACK/DTX, any, any}, except for {ACK, DTX, DTX, DTX} | ACK, ACK, ACK, ACK | $n_{PUCCH,2}$ | 0, 0 |
| ACK, ACK, ACK, NACK/DTX | NACK/DTX, any, any, any | $n_{PUCCH,1}$ | 1, 0 |
| ACK, ACK, ACK, NACK/DTX | {ACK, NACK/DTX, any, any}, except for {ACK, DTX, DTX, DTX} | $n_{PUCCH,1}$ | 1, 0 |
| ACK, ACK, NACK/DTX, any | NACK/DTX, any, any, any | $n_{PUCCH,1}$ | 0, 1 |
| ACK, ACK, NACK/DTX, any | {ACK, NACK/DTX, any, any}, except for {ACK, DTX, DTX, DTX} | $n_{PUCCH,1}$ | 0, 1 |
| ACK, DTX, DTX, DTX | NACK/DTX, any, any, any | $n_{PUCCH,0}$ | 1, 1 |
| ACK, DTX, DTX, DTX | {ACK, NACK/DTX, any, any}, except for {ACK, DTX, DTX, DTX} | $n_{PUCCH,0}$ | 1, 1 |
| ACK, ACK, ACK, ACK | NACK/DTX, any, any, any | $n_{PUCCH,0}$ | 1, 1 |
| ACK, ACK, ACK, ACK | {ACK, NACK/DTX, any, any}, except for {ACK, DTX, DTX, DTX} | $n_{PUCCH,0}$ | 1, 1 |
| NACK, any, any, any | NACK/DTX, any, any, any | $n_{PUCCH,0}$ | 0, 0 |
| NACK, any, any, any | {ACK, NACK/DTX, any, any}, except for {ACK, DTX, DTX, DTX} | $n_{PUCCH,0}$ | 0, 0 |
| {ACK, NACK/DTX, any, any}, except for {ACK, DTX, DTX, DTX} | NACK/DTX, any, any, any | $n_{PUCCH,0}$ | 0, 0 |
| {ACK, NACK/DTX, any, any}, except for {ACK, DTX, DTX, DTX} | {ACK, NACK/DTX, any, any}, except for {ACK, DTX, DTX, DTX} | $n_{PUCCH,0}$ | 0, 0 |
| DTX, any, any, any | NACK/DTX, any, any, any | No Transmission | |
| DTX, any, any, any | {ACK, NACK/DTX, any, any}, except for {ACK, DTX, DTX, DTX} | No Transmission | |

For a single-cell operation, HARQ-ACK multiplexing with channel selection conveys a number of HARQ-ACK states in a PUCCH, as described in the example of Table 3 for M=3, while HARQ-ACK transmission in a PUSCH conveys an individual information bit for each DL subframe in a bundling window (or for a number of DL subframes specified by a DAI IE in a UL SA scheduling a PUSCH transmission, if any). Therefore, a maximum of M HARQ-ACK information bits are conveyed. However, if a same approach for HARQ-ACK transmission in a PUSCH were to be followed for multi-cell (DL CA: Down Link Carrier Aggregation) operation, the maximum number of HARQ-ACK information bits would linearly scale with the number of configured cells to a UE. However, increasing the number of HARQ-ACK information bits in a PUSCH for UEs configured HARQ-ACK multiplexing with channel selection in a PUCCH may result in a failure to provide the required HARQ-ACK reception reliability and will often lead to different operations depending on the channel, PUCCH, or PUSCH, used to transmit the HARQ-ACK information.

SUMMARY OF THE INVENTION

Accordingly, the present invention has been designed to solve at least the aforementioned limitations and problems in the prior art and to provide at least the advantages described below.

An aspect of the present invention is to provide a method for transmitting acknowledgement information efficiently in response to data Transport Blocks (TBs) received in one or more downlink data channels in a Time Division Duplex (TDD) communication system.

Another aspect of the present invention is to provide a method for a UE configured with two or more cells in a TDD system to transmit HARQ-ACK information in a PUSCH, when it transmits HARQ-ACK information using multiplexing with channel selection in a PUCCH.

Another aspect of the present invention is to provide a mapping between HARQ-ACK bits transmitted in a PUSCH and the information that these bits represent.

Another aspect of the present invention is to provide a same understanding between a NodeB and a UE of the information represented by HARQ-ACK bits a UE transmits in a PUSCH.

In accordance with an aspect of the present invention, a method is provided for transmitting acknowledgement information by a user equipment (UE) in communication system. The method includes receiving one or more data transport blocks (TBs) in one or more downlink data channels over transmission time intervals (TTIs); generating acknowledgement information comprising four acknowledgement bits, jointly representing a state of reception results for the plurality of data TBs, if the UE is configured for reception of the downlink data channels from two cells, a number of the TTIs is three or four, and a number of the data TBs is greater than a number of the acknowledgement bits; generating acknowledgement information respectively representing a reception result for each data TB by a corresponding acknowledgement bit, if the UE is configured for reception of the downlink data channels from a single cell or two cells, and a number of the TTIs is one or two; encoding the acknowledgement bits; multiplexing the encoded acknowledgement bits with uplink data; and transmitting the multiplexed acknowledgement bits and the uplink data on an uplink data channel.

In accordance with another aspect of the present invention, a UE is provided for transmitting acknowledgement information in a communication system. The UE includes a transceiver; and a controller configured to control the transceiver to receive one or more data transport blocks (TBs) in one or more downlink data channels over transmission time intervals (TTIs), generate acknowledgement information comprising four acknowledgement bits, jointly representing a state of reception results for the plurality of data TBs, if the UE is configured for reception of the downlink data channels from two cells, a number of the TTIs is three or four, and a number of the data TBs is greater than a number of the acknowledgement bits, and generate acknowledgement information respectively representing a reception result for each data TB by a corresponding acknowledgement bit, if the UE is configured for reception of the downlink data channels from a single cell or two cells, and a number of the TTIs is one or two; an encoder configured to encode the acknowledgement bits; and a multiplexer configured to multiplex the encoded acknowledgement bits with uplink data. The controller is further configured to control the transceiver to transmit the multiplexed acknowledgement bits and the uplink data on an uplink data channel.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
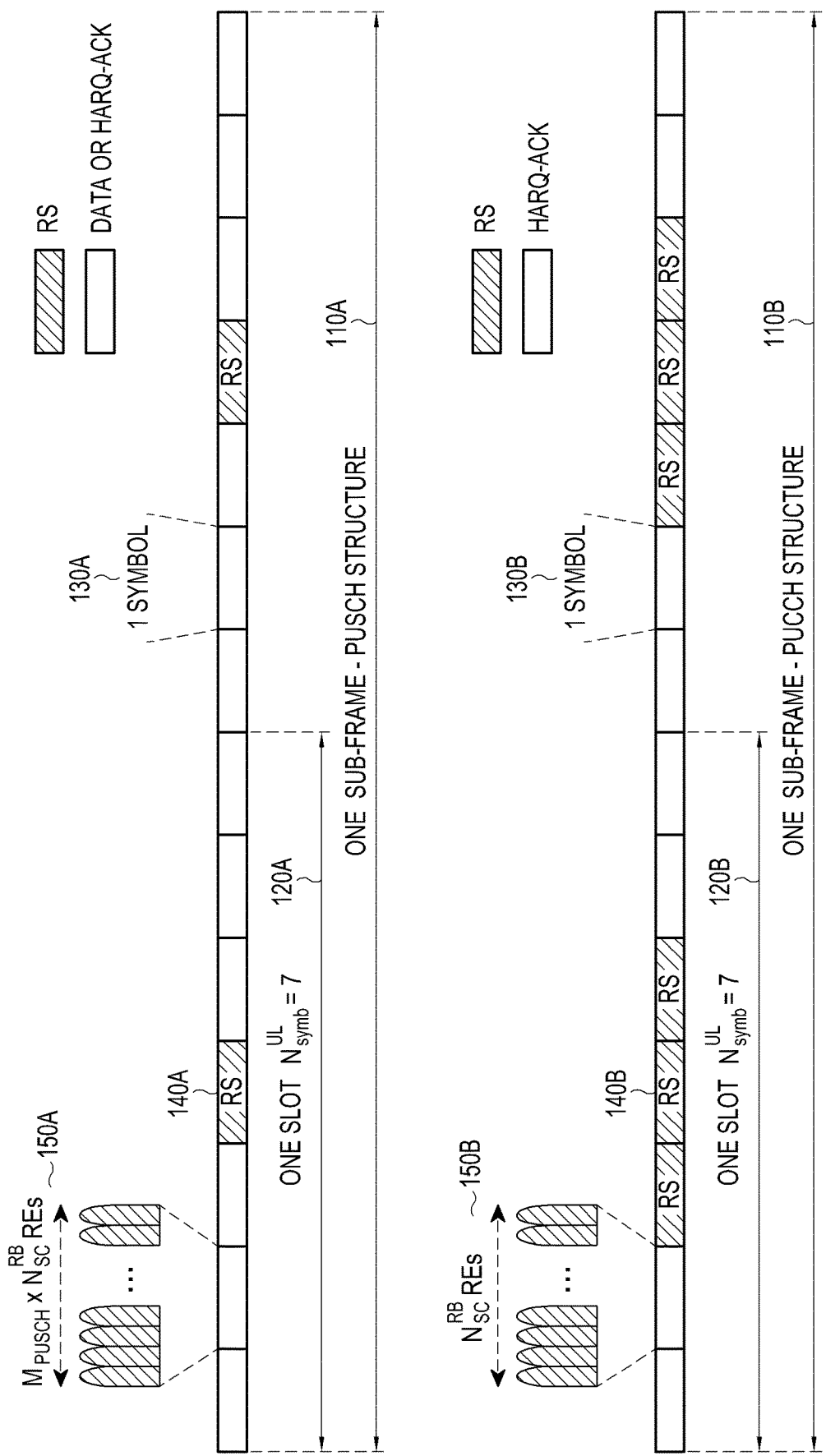
FIG. 1 is a diagram illustrating a conventional TTI for a PUSCH or for a PUCCH.
Figure 2:
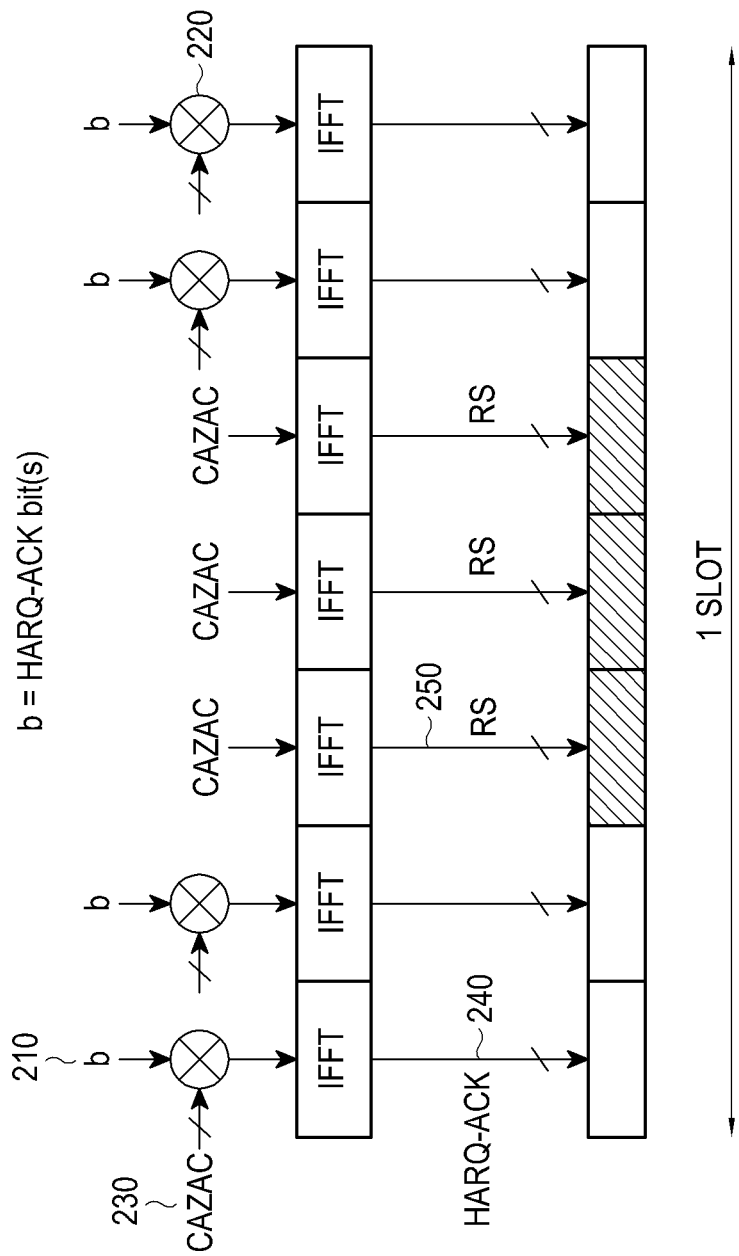
FIG. 2 is a diagram illustrating a conventional HARQ-ACK transmission structure in a PUCCH subframe slot.
Figure 3:
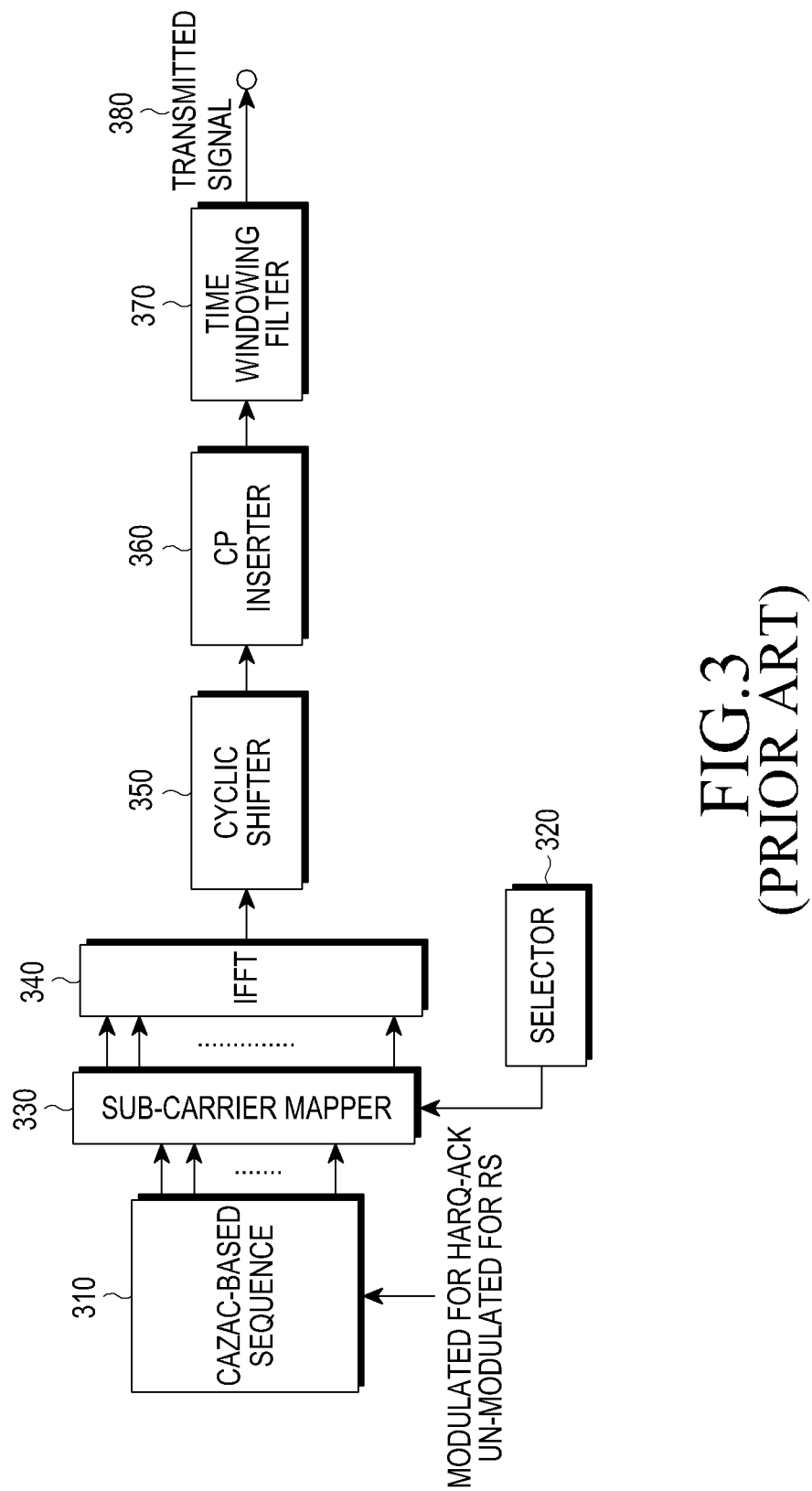
FIG. 3 is a block diagram illustrating a conventional transmitter for a PUCCH.
Figure 4:
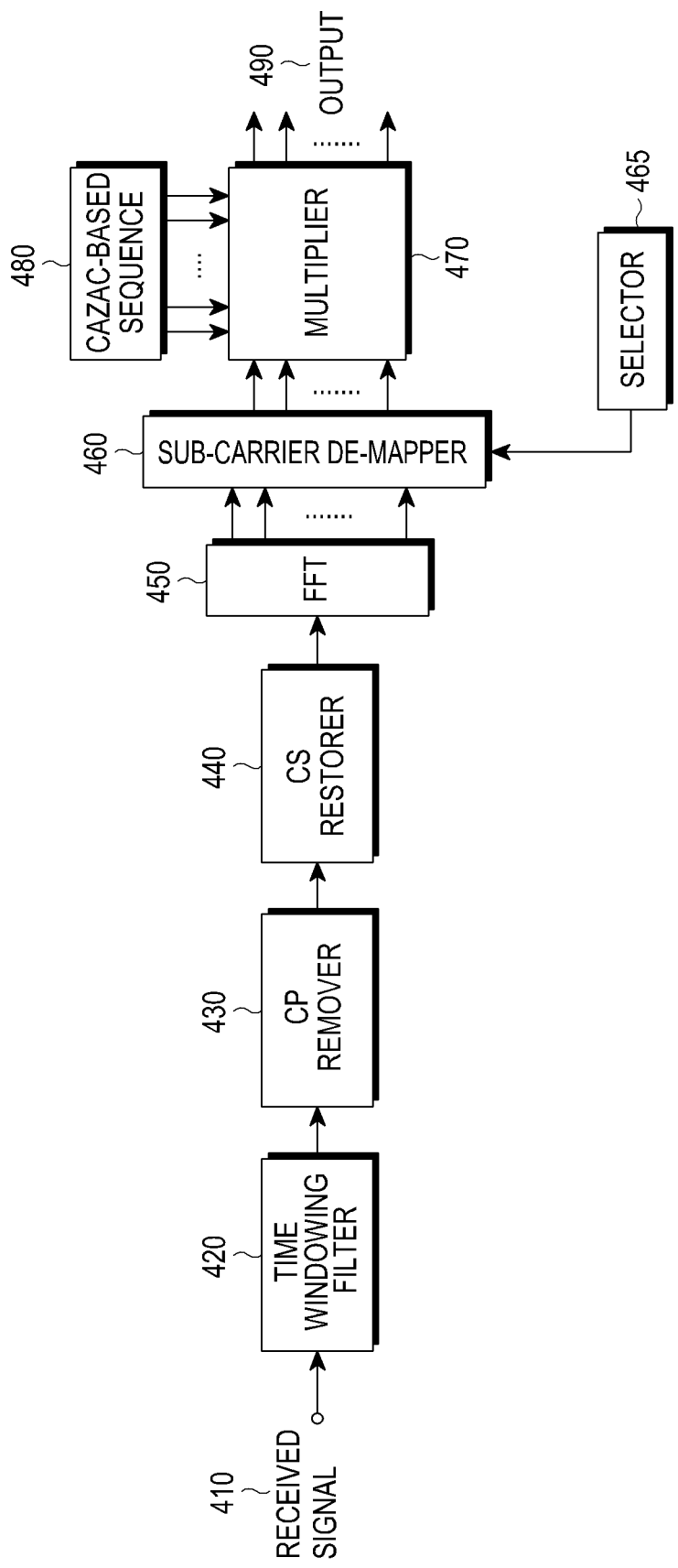
FIG. 4 is a block diagram illustrating a conventional receiver for a PUCCH.

Various embodiments of the present invention will now be described more fully hereinafter with reference to the accompanying drawings. This present invention may, however, be embodied in many different forms and should not be construed as limited to the embodiments set forth herein. Rather, these embodiments are provided so that this disclosure will be thorough and complete and will fully convey the scope of the present invention to those skilled in the art.

Additionally, although embodiments of the present invention will be described below with reference to DFT-spread OFDM transmission, the present invention is also applicable to Frequency Division Multiplexing (FDM) transmissions, such as Single-Carrier Frequency Division Multiple Access (SC-FDMA) and OFDM.

In the following descriptions for HARQ-ACK transmission in a PUSCH, the value of M (i.e., a number of PDSCHs for which a UE provides HARQ-ACK information or a size of bundling window or a number of TTIs) can either be fixed, as defined by a bundling window size for a particular configuration of a TDD system, or be variable, as defined by a value of a DAI IE in a UL SA conveyed by a PDCCH scheduling a PUSCH transmission, if such a UL SA exists. Further, although for simplicity is the descriptions assume that HARQ-ACK information is generated in response to a PDSCH reception, the HARQ-ACK information may also be generated in response to a PDCCH that does not schedule a PDSCH reception, but instead indicates a release of a Semi-Persistently Scheduled (SPS) PDSCH.

In accordance with an embodiment of the present invention, a UE is configured with two DL cells (the Pcell and a Scell) in a TDD system and mapping of HARQ-ACK states is performed as shown in Tables 4 and 5 (for M=3 and M=4, respectively) to input bits of an RM code used for encoding HARQ-ACK information in a PUSCH. This mapping is performed under the constraint that the number of HARQ-ACK information bits input to an RM code is limited to four, as HARQ-ACK multiplexing with channel selection in a PUCCH is assumed to be supported for only up to four HARQ-ACK information bits conveying different HARQ-ACK states. That is, two bits are conveyed through the selection of a PUCCH resource among four available resources, and another two bits are conveyed through a QPSK modulated signal by the respective constellation points.

Unlike conventional HARQ-ACK transmission in a PUSCH, where each HARQ-ACK information bit represents the outcome of respective data TB reception(s) in a PDSCH, in accordance with an embodiment of the present invention, the mapping of HARQ-ACK information to four input bits of an RM encoder for the above operating scenario includes HARQ-ACK states (a HARQ-ACK state is a set of correct or incorrect detection outcomes for data TBs) conveying combinations for values of HARQ-ACK bits as shown in Tables 4 and 5. Therefore, all four HARQ-ACK information bits are jointly considered and an individual HARQ-ACK bit does not have a respective individual interpretation (as it does not indicate an individual correct or incorrect detection outcome for data TBs). This alternative representation is used because the four input bits to an RM code do not suffice to represent all possible combinations for the individual outcomes of data TB reception(s) in each PDSCH in two cells for M=3 or M=4 (i.e., 6 or 8 bits, respectively, would be needed).

Conversely, for M=2, four input bits to an RM encoder can provide individual HARQ-ACK information about the outcome of data TB reception(s) in a PDSCH for each respective subframe of a bundling window and for each of the two cells (Pcell and Scell). For example, two of the four bits can be used to represent HARQ-ACK information for the Pcell and the other two can be used to represent HARQ-ACK information for the Scell with the first of the two bits corresponding to the first of the M=2 subframes and the second of the two bits corresponding to the second of the M=2 subframes. For M=1, two input bits to an RM encoder can provide individual HARQ-ACK information about the outcome a PDSCH reception in the Pcell and the Scell, respectively.

Figure 7:
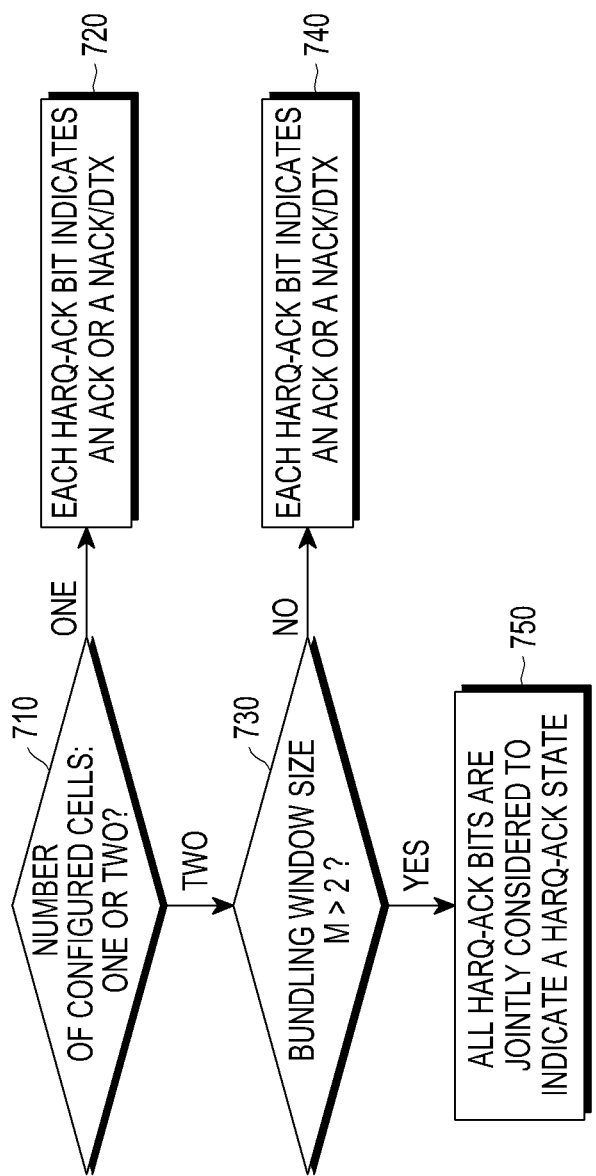
FIG. 7 is a flowchart illustrating a method of identifying HARQ-ACK bit representation depending on a number of configured cells and on a value of a bundling window, according to an embodiment of the present invention.

FIG. 7 is a flowchart illustrating a method of identifying HARQ-ACK bit representation depending on a number of configured cells and on a value of a bundling window, according to an embodiment of the present invention.

Referring to FIG. 7, for a PUSCH transmitter and a PUSCH receiver, the meaning of HARQ-ACK information bits in a PUSCH depends on whether a UE is configured one or two cells in step 710. If a UE is configured one cell, in step 720, the PUSCH transmitter or receiver determines that each HARQ-ACK information bit represents an outcome (e.g., ACK for binary '1' or NACK/DTX for binary '0') for a reception of TB(s) in a corresponding PDSCH, regardless of the value of M. This assumes that HARQ-ACK spatial-domain bundling applies if a PDSCH conveys multiple TBs, that a DTX state and a NACK state are jointly represented, and the explicit DTX feedback is not supported in a PUSCH; however, the reverse may also apply.

If a UE is configured two cells, the representation of HARQ-ACK information bits depends on the value of M in step 730. If M is smaller than or equal to 2, in step 740, the PUSCH transmitter or receiver determines that each HARQ-ACK information bit again represents an outcome (ACK for binary '1' or NACK/DTX for binary '0') for a reception of TB(s) in a corresponding PDSCH. However, if M is larger than 2, in step 750, the PUSCH transmitter or receiver determines that each HARQ-ACK information bit does not provide any information on its own and all HARQ-ACK information bits are jointly considered to indicate a HARQ-ACK state (set of outcomes for correct or incorrect detection of data TB(s) in respective PDSCH(s)) corresponding to both cells and all PDSCHs for which HARQ-ACK information is provided by a UE.

In accordance with another embodiment of the present invention, HARQ-ACK states, as represented in Tables 4 and 5, are transmitted in a PUCCH using channel selection, by the four input bits $\{o_0^{ACK} o_1^{ACK} o_2^{ACK} o_3^{ACK}\}$ to an RM encoder for transmission in a PUSCH. This representation is obtained by one-to-one mapping of a PUCCH resource and a constellation point of a QPSK modulation of a HARQ-ACK signal in a PUCCH to four input bits $\{o_0^{ACK} o_1^{ACK} o_2^{ACK} o_3^{ACK}\}$ of an RM code in a PUSCH, e.g., as shown in Table 6 for M=3 and in Table 7 for M=4.

For example, the first four PUCCH resources $\{n_{PUCCH,0}, n_{PUCCH,1}, n_{PUCCH,2}, n_{PUCCH,3}\}$ may be represented by RM input bits $\{o_0^{ACK} o_1^{ACK}\}$ and the four QPSK constellation points $\{(0, 0), (0, 1), (1, 0), (1, 1)\}$ in a PUCCH may be represented by RM input bits $\{o_2^{ACK} o_3^{ACK}\}$. In general, any representation of any two RM input bits for four PUCCH resources and of the other two RM input bits for the QPSK constellation points in a PUCCH may be used.

TABLE 6

Mapping of HARQ-ACK States to Input Bits of the RM Code for M = 3.

| Primary Cell | Secondary Cell | Resource | Constellation | RM Code Input Bits |
|---|---|---|---|---|
| HARQ-ACK(0), HARQ-ACK(1), HARQ-ACK(2) | HARQ-ACK(0), HARQ-ACK(1), HARQ-ACK(2) | $n_{PUCCH}$ | b(0), b(1) | $\{o_0^{ACK} o_1^{ACK} o_2^{ACK} o_3^{ACK}\}$ |
| ACK, ACK, ACK | ACK, ACK, ACK | $n_{PUCCH,1}$ | 1, 1 | 0, 1, 1, 1 |
| ACK, ACK, NACK/DTX | ACK, ACK, ACK | $n_{PUCCH,1}$ | 0, 0 | 0, 1, 0, 0 |

TABLE 6-continued

Mapping of HARQ-ACK States to Input Bits of the RM Code for M = 3.

| Primary Cell | Secondary Cell | Resource | Constellation | RM Code Input Bits |
|---|---|---|---|---|
| ACK, NACK/DTX, any | ACK, ACK, ACK | $n_{PUCCH,3}$ | 1, 1 | 1, 1, 1, 1 |
| NACK/DTX, any, any | ACK, ACK, ACK | $n_{PUCCH,3}$ | 0, 1 | 1, 1, 0, 1 |
| ACK, ACK, ACK | ACK, ACK, NACK/DTX | $n_{PUCCH,0}$ | 1, 0 | 0, 0, 1, 0 |
| ACK, ACK, NACK/DTX | ACK, ACK, NACK/DTX | $n_{PUCCH,3}$ | 1, 0 | 1, 1, 1, 0 |
| ACK, NACK/DTX, any | ACK, ACK, NACK/DTX | $n_{PUCCH,0}$ | 0, 1 | 0, 0, 0, 1 |
| NACK/DTX, any, any | ACK, ACK, NACK/DTX | $n_{PUCCH,3}$ | 0, 0 | 1, 1, 0, 0 |
| ACK, ACK, ACK | ACK, NACK/DTX, any | $n_{PUCCH,2}$ | 1, 1 | 1, 0, 1, 1 |
| ACK, ACK, NACK/DTX | ACK, NACK/DTX, any | $n_{PUCCH,2}$ | 0, 1 | 1, 0, 0, 1 |
| ACK, NACK/DTX, any | ACK, NACK/DTX, any | $n_{PUCCH,2}$ | 1, 0 | 1, 0, 1, 0 |
| NACK/DTX, any, any | ACK, NACK/DTX, any | $n_{PUCCH,2}$ | 0, 0 | 1, 0, 0, 0 |
| ACK, ACK, ACK | NACK/DTX, any, any | $n_{PUCCH,1}$ | 1, 0 | 0, 1, 1, 0 |
| ACK, ACK, NACK/DTX | NACK/DTX, any, any | $n_{PUCCH,1}$ | 0, 1 | 0, 1, 0, 1 |
| ACK, NACK/DTX, any | NACK/DTX, any, any | $n_{PUCCH,0}$ | 1, 1 | 0, 0, 1, 1 |
| NACK, any, any | NACK/DTX, any, any | $n_{PUCCH,0}$ | 0, 0 | 0, 0, 0, 0 |
| DTX, any, any | NACK/DTX, any, any | | No Transmission | 0, 0, 0, 0 |

TABLE 7

Mapping of HARQ-ACK States to Input Bits of the RM Code for M = 4.

| Primary Cell | Secondary Cell | Resource | Constellation | RM Code Input Bits |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n_{PUCCH}$ | b(0), b(1) | $\{O_0^{ACK} O_1^{ACK} O_2^{ACK} O_3^{ACK}\}$ |
| ACK, ACK, ACK, NACK/DTX | ACK, ACK, ACK, NACK/DTX | $n_{PUCCH,1}$ | 1, 1 | 0, 1, 1, 1 |
| ACK, ACK, NACK/DTX, any | ACK, ACK, ACK, NACK/DTX | $n_{PUCCH,1}$ | 0, 0 | 0, 1, 0, 0 |
| ACK, DTX, DTX, DTX | ACK, ACK, ACK, NACK/DTX | $n_{PUCCH,3}$ | 1, 1 | 1, 1, 1, 1 |
| ACK, ACK, ACK, ACK | ACK, ACK, ACK, NACK/DTX | $n_{PUCCH,3}$ | 1, 1 | 1, 1, 1, 1 |
| NACK/DTX, any, any, any | ACK, ACK, ACK, NACK/DTX | $n_{PUCCH,3}$ | 0, 1 | 1, 1, 0, 1 |
| {ACK, NACK/DTX, any, any}, except for {ACK, DTX, DTX, DTX} | ACK, ACK, ACK, NACK/DTX | $n_{PUCCH,3}$ | 0, 1 | 1, 1, 0, 1 |
| ACK, ACK, ACK, NACK/DTX | ACK, ACK, NACK/DTX, any | $n_{PUCCH,0}$ | 1, 0 | 0, 0, 1, 0 |
| ACK, ACK, NACK/DTX, any | ACK, ACK, NACK/DTX, any | $n_{PUCCH,3}$ | 1, 0 | 1, 1, 1, 0 |
| ACK, DTX, DTX, DTX | ACK, ACK, NACK/DTX, any | $n_{PUCCH,0}$ | 0, 1 | 0, 0, 0, 1 |
| ACK, ACK, ACK, ACK | ACK, ACK, NACK/DTX, any | $n_{PUCCH,0}$ | 0, 1 | 0, 0, 0, 1 |
| NACK/DTX, any, any, any | ACK, ACK, NACK/DTX, any | $n_{PUCCH,3}$ | 0, 0 | 1, 1, 0, 0 |
| {ACK, NACK/DTX, any, any}, except for {ACK, DTX, DTX, DTX} | ACK, ACK, NACK/DTX, any | $n_{PUCCH,3}$ | 0, 0 | 1, 1, 0, 0 |

TABLE 7-continued

Mapping of HARQ-ACK States to Input Bits of the RM Code for M = 4.

| Primary Cell | Secondary Cell | Resource | Constellation | RM Code Input Bits |
|---|---|---|---|---|
| ACK, ACK, ACK, NACK/DTX | ACK, DTX, DTX, DTX | $n_{PUCCH,2}$ | 1, 1 | 1, 0, 1, 1 |
| ACK, ACK, ACK, NACK/DTX | ACK, ACK, ACK, ACK | $n_{PUCCH,2}$ | 1, 1 | 1, 0, 1, 1 |
| ACK, ACK, NACK/DTX, any | ACK, DTX, DTX, DTX | $n_{PUCCH,2}$ | 0, 1 | 1, 0, 0, 1 |
| ACK, ACK, NACK/DTX, any | ACK, ACK, ACK, ACK | $n_{PUCCH,2}$ | 0, 1 | 1, 0, 0, 1 |
| ACK, DTX, DTX, DTX | ACK, DTX, DTX, DTX | $n_{PUCCH,2}$ | 1, 0 | 1, 0, 1, 0 |
| ACK, DTX, DTX, DTX | ACK, ACK, ACK, ACK | $n_{PUCCH,2}$ | 1, 0 | 1, 0, 1, 0 |
| ACK, ACK, ACK, ACK | ACK, DTX, DTX, DTX | $n_{PUCCH,2}$ | 1, 0 | 1, 0, 1, 0 |
| ACK, ACK, ACK, ACK | ACK, ACK, ACK, ACK | $n_{PUCCH,2}$ | 1, 0 | 1, 0, 1, 0 |
| NACK/DTX, any, any, any | ACK, DTX, DTX, DTX | $n_{PUCCH,2}$ | 0, 0 | 1, 0, 0, 0 |
| NACK/DTX, any, any, any | ACK, ACK, ACK, ACK | $n_{PUCCH,2}$ | 0, 0 | 1, 0, 0, 0 |
| {ACK, NACK/DTX, any, any}, except for {ACK, DTX, DTX, DTX} | ACK, DTX, DTX, DTX | $n_{PUCCH,2}$ | 0, 0 | 1, 0, 0, 0 |
| {ACK, NACK/DTX, any, any}, except for {ACK, DTX, DTX, DTX} | ACK, ACK, ACK, ACK | $n_{PUCCH,2}$ | 0, 0 | 1, 0, 0, 0 |
| ACK, ACK, ACK, NACK/DTX | NACK/DTX, any, any, any | $n_{PUCCH,1}$ | 1, 0 | 0, 1, 1, 0 |
| ACK, ACK, ACK, NACK/DTX | {ACK, NACK/DTX, any, any}, except for {ACK, DTX, DTX, DTX} | $n_{PUCCH,1}$ | 1, 0 | 0, 1, 1, 0 |
| ACK, ACK, NACK/DTX, any | NACK/DTX, any, any, any | $n_{PUCCH,1}$ | 0, 1 | 0, 1, 0, 1 |
| ACK, ACK, NACK/DTX, any | {ACK, NACK/DTX, any, any}, except for {ACK, DTX, DTX, DTX} | $n_{PUCCH,1}$ | 0, 1 | 0, 1, 0, 1 |
| ACK, DTX, DTX, DTX | NACK/DTX, any, any, any | $n_{PUCCH,0}$ | 1, 1 | 0, 0, 1, 1 |
| ACK, DTX, DTX, DTX | {ACK, NACK/DTX, any, any}, except for {ACK, DTX, DTX, DTX} | $n_{PUCCH,0}$ | 1, 1 | 0, 0, 1, 1 |
| ACK, ACK, ACK, ACK | NACK/DTX, any, any, any | $n_{PUCCH,0}$ | 1, 1 | 0, 0, 1, 1 |
| ACK, ACK, ACK, ACK | {ACK, NACK/DTX, any, any}, except for {ACK, DTX, DTX, DTX} | $n_{PUCCH,0}$ | 1, 1 | 0, 0, 1, 1 |
| NACK, any, any, any | NACK/DTX, any, any, any | $n_{PUCCH,0}$ | 0, 0 | 0, 0, 0, 0 |
| NACK, any, any, any | {ACK, NACK/DTX, any, any}, except for {ACK, DTX, DTX, DTX} | $n_{PUCCH,0}$ | 0, 0 | 0, 0, 0, 0 |
| {ACK, NACK/DTX, any, any}, except for {ACK, DTX, DTX, DTX} | NACK/DTX, any, any, any | $n_{PUCCH,0}$ | 0, 0 | 0, 0, 0, 0 |
| {ACK, NACK/DTX, any, any}, except for {ACK, DTX, DTX, DTX} | {ACK, NACK/DTX, any, any}, except for {ACK, DTX, DTX, DTX} | $n_{PUCCH,0}$ | 0, 0 | 0, 0, 0, 0 |
| DTX, any, any, any | NACK/DTX, any, any, any | | No Transmission | 0, 0, 0, 0 |
| DTX, any, any, any | {ACK, NACK/DTX, any, any}, except for {ACK, DTX, DTX, DTX} | | No Transmission | 0, 0, 0, 0 |

Conversely, the representation of HARQ-ACK states to four input bits $\{o_0^{ACK}\ o_1^{ACK}\ o_2^{ACK}\ o_3^{ACK}\}$ of an RM encoder for M=2 is obtained as shown in Table 8 below. Each individual HARQ-ACK bit now provides individual information with a binary '1' representing an 'ACK' and a binary '0' representing a 'NACK/DTX' for a corresponding PDSCH reception. There is no link between the four input bits $\{o_0^{ACK}\ o_1^{ACK}\ o_2^{ACK}\ o_3^{ACK}\}$ of an RM code for HARQ-ACK transmission in a PUSCH and the PUCCH resources or the constellation point of a QPSK modulated signal for HARQ-ACK in a PUCCH. Similar observations apply for the representation of HARQ-ACK states to the two input bits $\{o_0^{ACK}\ o_1^{ACK}\}$ of a simplex (3, 2) code for M=1, which is obtained as shown in Table 9.

for the Scell using a mapping as shown in Table 6 for M=3 or a mapping as shown in Table 7 for M=4.

In accordance with another embodiment of the present invention, a same understanding is established between a UE and a serving NodeB for the inclusion of HARQ-ACK information in a PUSCH. Consequently, a serving NodeB is not required to detect whether a particular set of PUSCH REs conveys data information or HARQ-ACK information, because such detection may not be reliable. For HARQ-ACK signal transmission in a PUCCH, such detection is relatively simple as a NodeB can decide whether a signal is transmitted or not by merely computing the received energy in candidate PUCCH resources.

TABLE 8

Mapping of HARQ-ACK States to Input Bits of the RM Code for M = 2.

| Primary Cell | Secondary Cell | RM Code Input Bits |
|---|---|---|
| HARQ-ACK(0), HARQ-ACK(1) | HARQ-ACK(0), HARQ-ACK(1) | $\{O_0^{ACK}\ O_1^{ACK}\ O_2^{ACK}\ O_3^{ACK}\}$ |
| ACK, ACK | ACK, ACK | 1, 1, 1, 1 |
| ACK, NACK/DTX | ACK, ACK | 1, 0, 1, 1 |
| NACK/DTX, ACK | ACK, ACK | 0, 1, 1, 1 |
| NACK/DTX, NACK/DTX | ACK, ACK | 0, 0, 1, 1 |
| ACK, ACK | ACK, NACK/DTX | 1, 1, 1, 0 |
| ACK, NACK/DTX | ACK, NACK/DTX | 1, 0, 1, 0 |
| NACK/DTX, ACK | ACK, NACK/DTX | 0, 1, 1, 0 |
| NACK/DTX, NACK/DTX | ACK, NACK/DTX | 0, 0, 1, 0 |
| ACK, ACK | NACK/DTX, ACK | 1, 1, 0, 1 |
| ACK, NACK/DTX | NACK/DTX, ACK | 1, 0, 0, 1 |
| NACK/DTX, ACK | NACK/DTX, ACK | 0, 1, 0, 1 |
| NACK/DTX, NACK/DTX | NACK/DTX, ACK | 0, 0, 0, 1 |
| ACK, ACK | NACK/DTX, NACK/DTX | 1, 1, 0, 0 |
| ACK, NACK/DTX | NACK/DTX, NACK/DTX | 1, 0, 0, 0 |
| NACK/DTX, ACK | NACK/DTX, NACK/DTX | 0, 1, 0, 0 |
| NACK/DTX, NACK/DTX | NACK/DTX, NACK/DTX | 0, 0, 0, 0 |

TABLE 9

Mapping of HARQ-ACK States to Input Bits of the Simplex Code for M = 1.

| Primary Cell | Secondary Cell | Simplex Code Input Bits |
|---|---|---|
| HARQ-ACK(0) | HARQ-ACK(0) | $\{O_0^{ACK}\ O_1^{ACK}\}$ |
| ACK | ACK | 1, 1 |
| NACK/DTX | ACK | 0, 1 |
| ACK | NACK/DTX | 1, 0 |
| NACK/DTX | NACK/DTX | 0, 0 |

Figure 8:
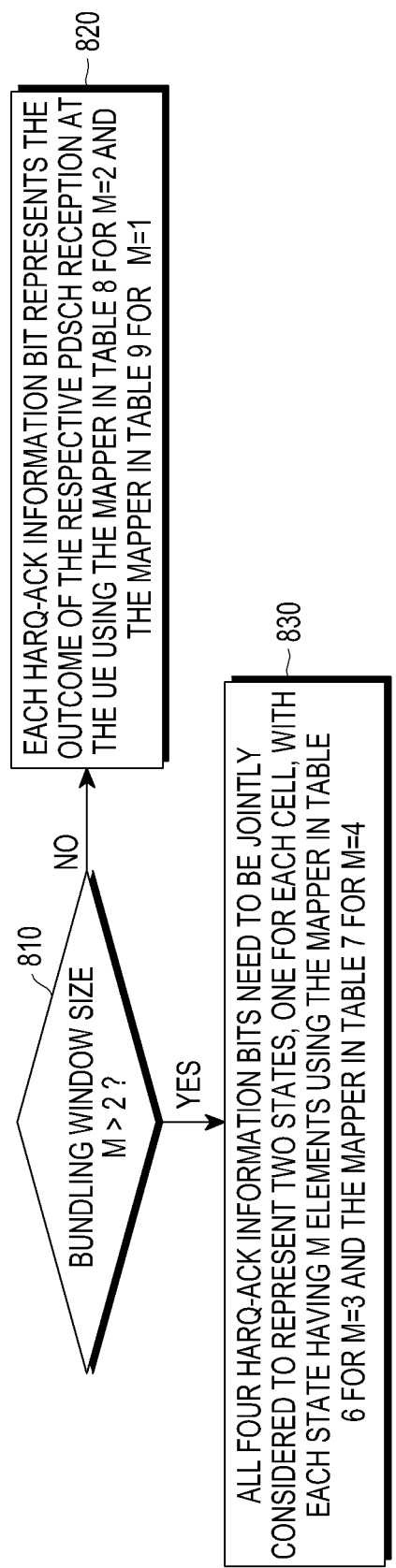
FIG. 8 is a flowchart illustrating an encoding and decoding process of HARQ-ACK information for a UE configured with two cells, depending on a value of a bundling window, according to an embodiment of the present invention.

FIG. 8 illustrates encoding and decoding of HARQ-ACK information for a UE configured with two cells depending on a value of a bundling window, according to an embodiment of the present invention.

Referring to FIG. 8, the encoding and decoding for a UE configured with two cells and for a PUSCH transmitter and a PUSCH receiver, respectively, depends on a value of M in step 810. If M is less than two, in step 820, each HARQ-ACK information bit represents an outcome (e.g., ACK or NACK/DTX) of a respective PDSCH reception. However, if M is greater than two, in step 830, each HARQ-ACK information bit does not provide individual information; instead, all four HARQ-ACK information bits are jointly considered to represent a HARQ-ACK state (set of outcomes for correct or incorrect detection of data TB(s)) in respective PDSCH(s)) for the Pcell and a HARQ-ACK state If a PUSCH transmission is scheduled by a UL SA through the transmission of a corresponding PDCCH, the respective DCI format is assumed to include a DAI IE informing a UE whether or not a NodeB expects it to transmit HARQ-ACK information in a PUSCH. This DAI IE may also provide additional information, e.g., the maximum number of PDSCH transmitted to a UE either in the Pcell or in the Scell, and the value of M can be set equal to this number. If a PUSCH transmission is SPS and not scheduled by a UL SA, then a UE may include HARQ-ACK information in a PUSCH for all DL subframes in a bundling window. M is then equal to the bundling window size.

In order to include HARQ-ACK information in a PUSCH (when a NodeB expects a UE to transmit HARQ-ACK information in a PUSCH), the HARQ-ACK states as shown in Tables 4 or 5, for which a UE does not transmit a HARQ-ACK signal in a PUCCH, should be mapped to actual HARQ-ACK information bits in a PUSCH, when M=3 and M=4.

For M=3, the last state in Table 4 is overlapped with the second to last state in Table 6 and both are represented by {0, 0, 0, 0} input bits to an RM encoder. Similarly, for M=4, the last two states in Table 5 are overlapped with the {NACK, any, any, any} and the {NACK/DTX, any, any, any} states in Table 7 for the Pcell and the Scell, respectively, and are represented by {0, 0, 0, 0} input bits to an RM encoder.

Figure 9:
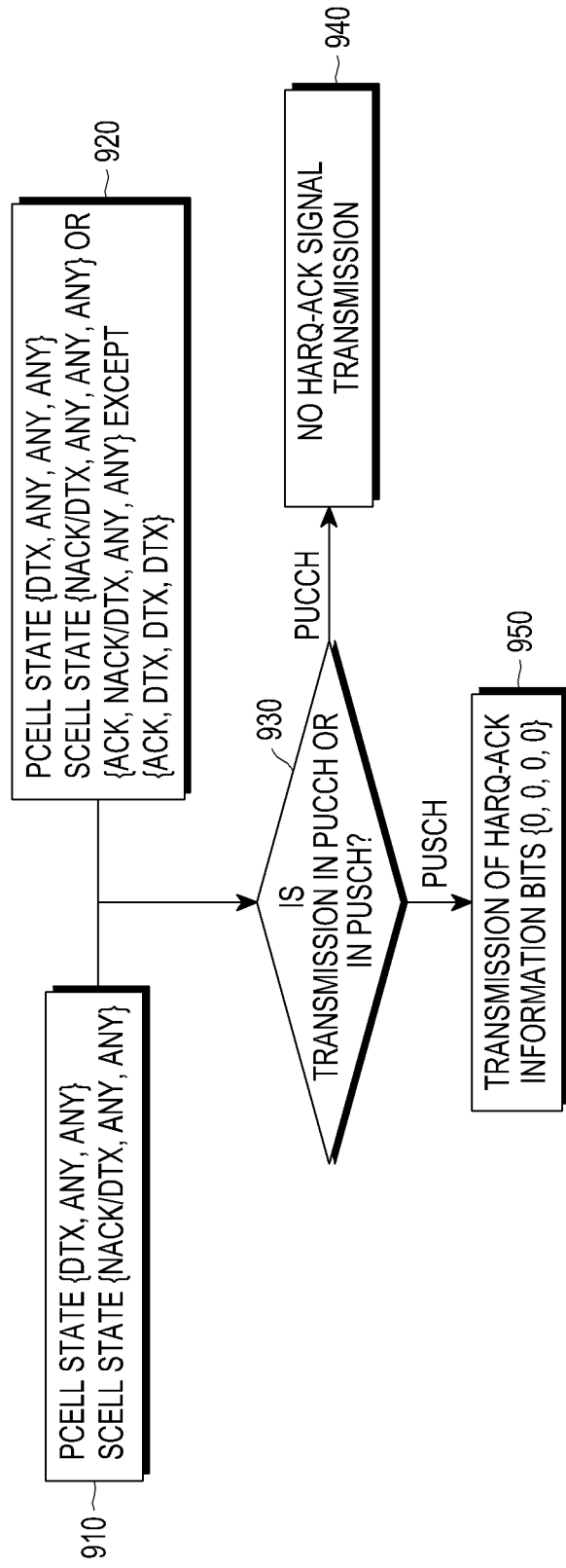
FIG. 9 is a flowchart illustrating an encoding and decoding process of HARQ-ACK states, depending on whether a transmission is in a PUCCH or in a PUSCH, for M=3 or M=4 subframes, according to an embodiment of the present invention.

FIG. 9 illustrates an encoding and decoding process of HARQ-ACK states depending on whether a transmission is in a PUCCH or in a PUSCH for M=3 or M=4 subframes, according to an embodiment of the present invention.

Referring to FIG. 9, the encoding and decoding of the {DTX, any, any} state in the Pcell and of the {NACK/DTX, any, any} state in the Scell for M=3 in step 910, and the encoding and decoding of the {DTX, any, any, any} state in the Pcell and of the {NACK/DTX, any, any, any} or the {ACK, NACK/DTX, any, any} state (except for {ACK, DTX, DTX, DTX} state) in the Scell for M=4 in step 920 depends on whether HARQ-ACK information is to be transmitted in a PUCCH or in a PUSCH in step 930. When HARQ-ACK information is to be transmitted in a PUCCH, there is no HARQ-ACK signal transmission for these HARQ-ACK states in step 940. When HARQ-ACK information is to be transmitted in a PUSCH, {0, 0, 0, 0} bits are used to represent these HARQ-ACK states in step 950.

Figure 10:
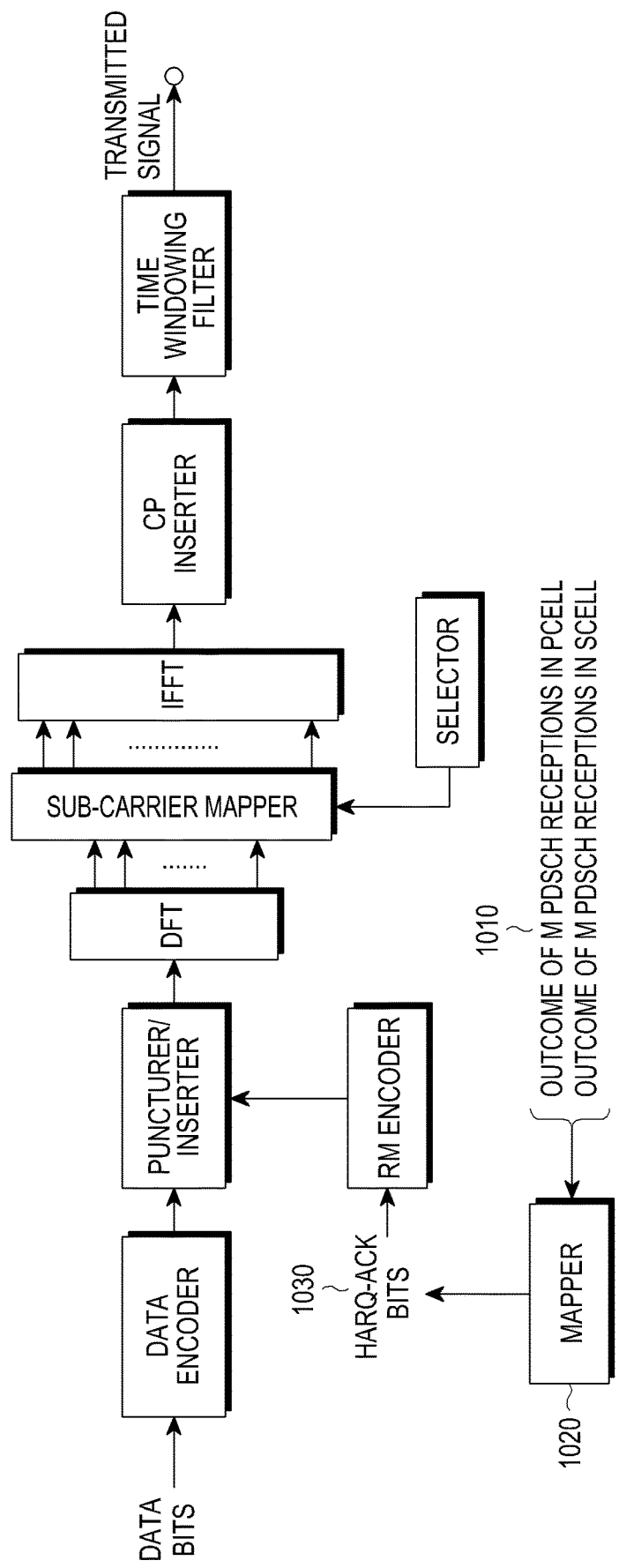
FIG. 10 is a block diagram illustrating a transmitter for transmitting data and HARQ-ACK information in a PUSCH, according to an embodiment of the present invention.

FIG. 10 illustrates block diagram of a transmitter for data and HARQ-ACK in a PUSCH, according to an embodiment of the present invention. Specifically, in FIG. 10, a representation of HARQ-ACK information bits depends on the number of cells a UE is configured and on whether each HARQ-ACK information bit informs of an outcome for a respective PDSCH reception in a respective cell or whether all HARQ-ACK information bits jointly inform of HARQ-ACK states corresponding to M PDSCH receptions in both cells.

Figure 5:
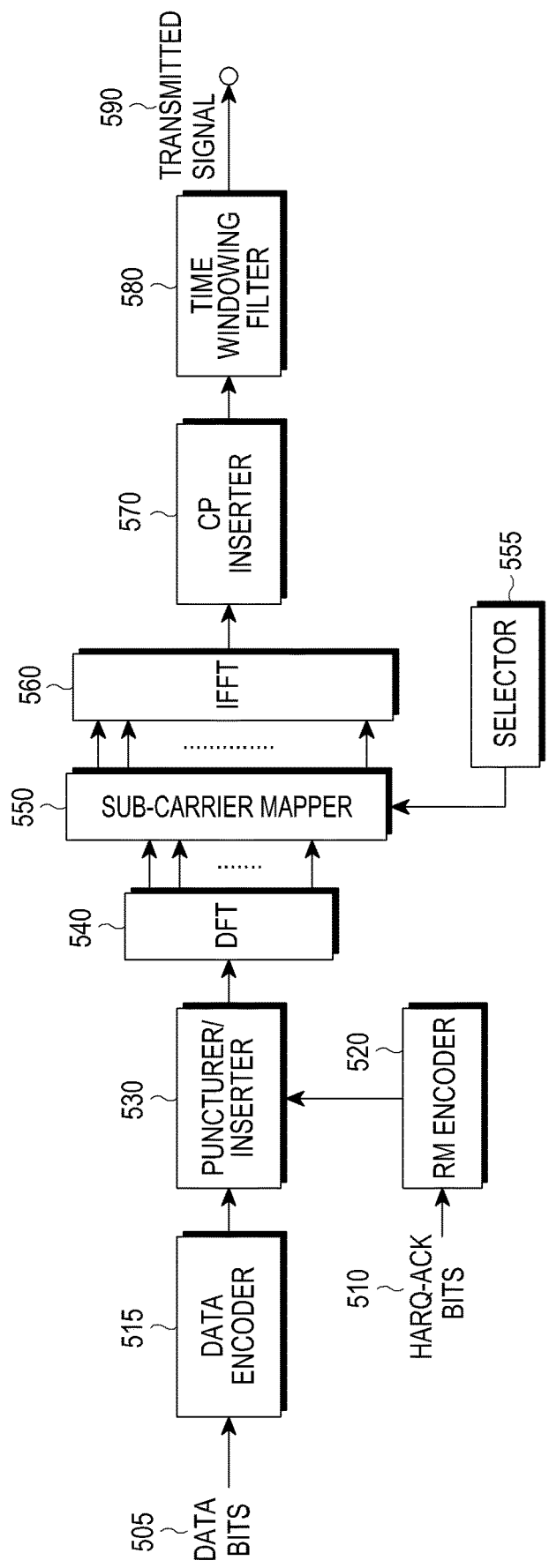
FIG. 5 is a block diagram illustrating a conventional transmitter for data and HARQ-ACK in a PUSCH.

Referring to FIG. 10, if a UE is configured with one cell or if a UE is configured with two cells and it is M≤2, each HARQ-ACK information bit corresponds to an outcome (ACK or NACK/DTX) of a respective PDSCH reception as described with reference to FIG. 5. However, if a UE is configured with two cells and M>2, a UE transmitter as illustrated in FIG. 10 operates similarly to the transmitter of FIG. 5, except that the outcomes for M PDSCH receptions (combinations of ACK and NACK/DTX) for each of the two cells 1010 form two respective HARQ-ACK states, which are provided to a mapper 1020, as described for example in Table 6 for M=3 and Table 7 for M=4, which then generates the HARQ-ACK information bits 1030, which are provided to an RM encoder.

Figure 11:
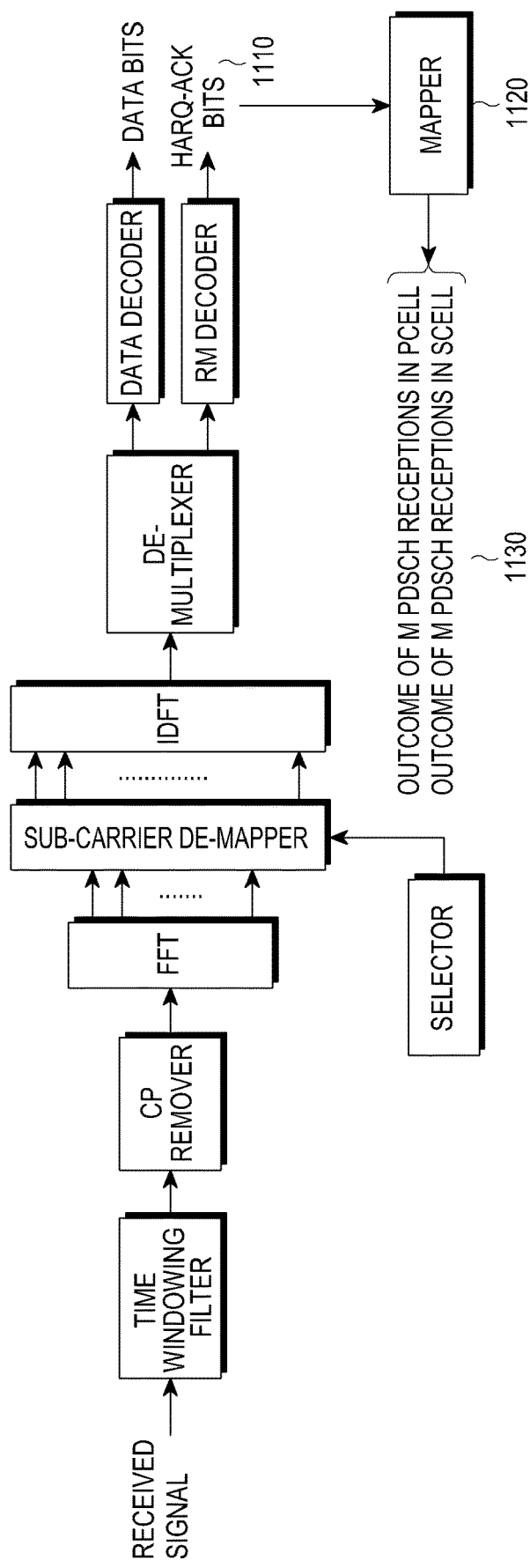
FIG. 11 is a block diagram illustrating a receiver for receiving data and HARQ-ACK information in a PUSCH, according to an embodiment of the present invention.

FIG. 11 illustrates a block diagram of a receiver for data and HARQ-ACK in a PUSCH, according to an embodiment of the present invention. Specifically, in FIG. 11, a representation of HARQ-ACK information bits depends on the number of cells a UE is configured and on whether each HARQ-ACK information bit informs of an outcome for a respective PDSCH reception in a respective cell or whether all HARQ-ACK information bits jointly inform of HARQ-ACK states corresponding to M PDSCH receptions in both cells.

Figure 6:
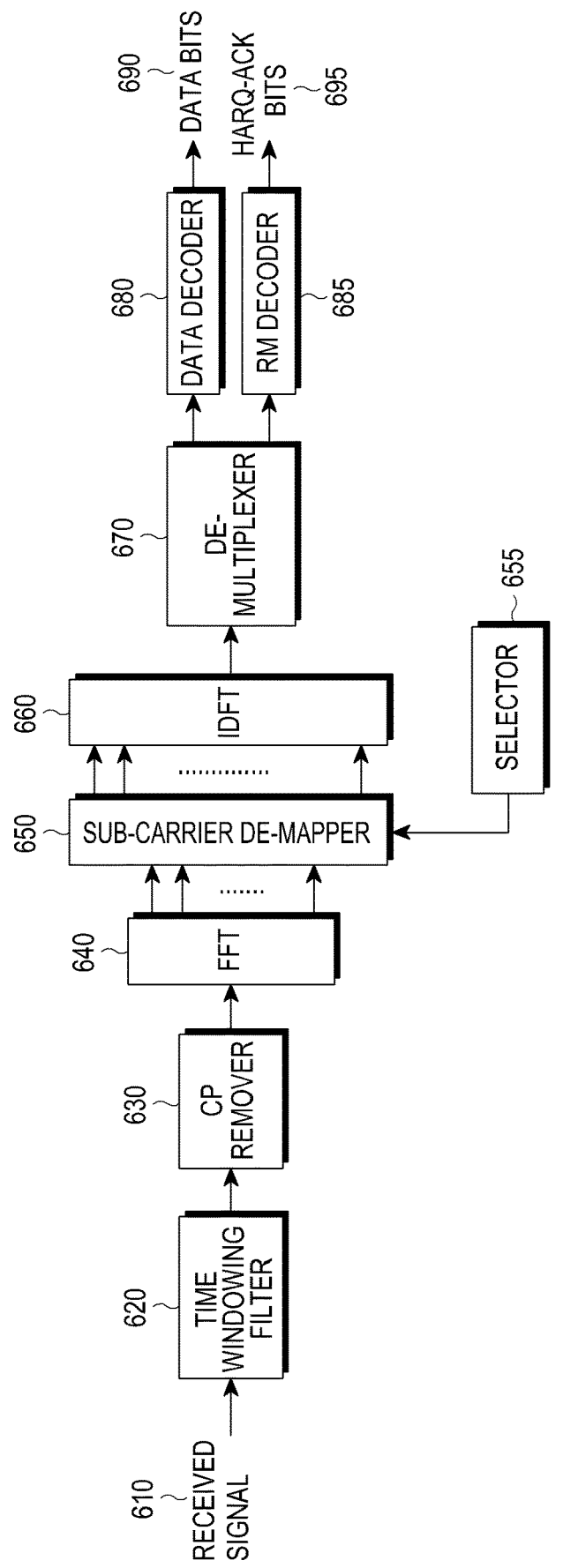
FIG. 6 is a block diagram illustrating a conventional receiver for data and HARQ-ACK in a PUSCH.

Referring to FIG. 11, if a UE is configured with one cell or if a UE is configured with two cells and it is M≤2, each HARQ-ACK information bit corresponds to an outcome (ACK or NACK/DTX) of a respective PDSCH reception, as described with reference to FIG. 6. However, if a UE is configured with two cells and M>2, a NodeB receiver as illustrated in FIG. 11 operates similarly to the receiver illustrated in FIG. 6, except that a decoder output for HARQ-ACK information bits 1110 is provided to a mapper 1120, e.g., as described in Table 6 for M=3 or Table 7 for M=4, which then generates two HARQ-ACK states representing outcomes 1130 for M PDSCH receptions (combinations of ACK and NACK/DTX) for each of the two cells.

One or more blocks in a transmitter and a receiver described in embodiments of the present invention can be implemented into a controller and the controller generates or receives acknowledgement bits (i.e. acknowledgement information) according to the present invention.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting acknowledgement information by a user equipment (UE) in communication system, the method comprising the steps of:
receiving one or more data transport blocks (TBs) in one or more downlink data channels over transmission time intervals (TTIs);
generating acknowledgement information comprising four acknowledgement bits, jointly representing a state of reception results for the plurality of data TBs, if the UE is configured for reception of the downlink data channels from two cells, a number of the TTIs is three or four, and a number of the data TBs is greater than a number of the acknowledgement bits;
generating acknowledgement information respectively representing a reception result for each data TB by a corresponding acknowledgement bit, if the UE is configured for reception of the downlink data channels from a single cell or two cells, and a number of the TTIs is one or two;
encoding the acknowledgement bits;
multiplexing the encoded acknowledgement bits with uplink data; and
transmitting the multiplexed acknowledgement bits and the uplink data on an uplink data channel.

2. The method of claim 1, wherein the acknowledgement information is generated at each of the TTIs.

3. The method of claim 1, wherein a single reception result is generated by the UE, when the UE receives more than one data TB on a downlink data channel, and
wherein the single reception result indicates correct detection, if all of the data TBs were correctly detected, and indicates incorrect detection, if at least one of the data TBs was incorrectly detected by the UE.

4. The method of claim 1, wherein when the UE does not detect a data TB or a control channel releasing transmission of the downlink data channel in a TTI, the UE generates a single reception result indicating the incorrect detection.

5. The method of claim 1, wherein when the acknowledgement information is transmitted on uplink control channel, the acknowledgement information is generated by using bits indicating resources of the uplink control channel and bits indicating a constellation point of the uplink control channel.

6. The method of claim 1, wherein the acknowledgement bits are encoded by Reed-Mueller (RM) encoding.

7. The method of claim 1, wherein one of the state of reception results is represented as {NACK, any, any, any} and {NACK/DTX, any, any, any} for a first cell and a second cell of the two cells, respectively, or represented as {NACK, any, any} and {NACK/DTX, any, any} for the first cell and the second cell of the two cells, respectively by all acknowledgement information bits {0, 0, 0, 0}, if the UE is configured for reception of the downlink data channels from two cells and the number of the TTIs is three or four, and
wherein the 'NACK' indicates 'Negative ACK', the 'DTX' indicates 'Discontinuous Transmission', and the 'any' indicates one of 'ACK', 'NACK' or 'DTX'.

8. The method of claim 1, wherein another one of the state of reception results is represented as {DTX, any, any, any} and {NACK/DTX, any, any, any} for a first cell and a second cell of the two cells, respectively, or represented as {DTX, any, any} and {NACK/DTX, any, any} for the first cell and the second cell of the two cells, respectively by all acknowledgement information bits {0, 0, 0, 0}, if the UE is configured for reception of the downlink data channels from two cells and the number of the TTIs is three or four, and wherein the 'NACK' indicates 'Negative ACK', the 'DTX' indicates 'Discontinuous Transmission', and the 'any' indicates one of 'ACK', 'NACK' or 'DTX'.

9. A User Equipment (UE) for transmitting acknowledgement information in a communication system, the UE comprising:

a transceiver; and
a controller configured to:
control the transceiver to receive one or more data transport blocks (TBs) in one or more downlink data channels over transmission time intervals (TTIs),
generate acknowledgement information comprising four acknowledgement bits, jointly representing a state of reception results for the plurality of data TBs, if the UE is configured for reception of the downlink data channels from two cells, a number of the TTIs is three or four, and a number of the data TBs is greater than a number of the acknowledgement bits, and
generate acknowledgement information respectively representing a reception result for each data TB by a corresponding acknowledgement bit, if the UE is configured for reception of the downlink data channels from a single cell or two cells, and a number of the TTIs is one or two;
an encoder configured to encode the acknowledgement bits; and
a multiplexer configured to multiplex the encoded acknowledgement bits with uplink data,
wherein the controller is further configured to control the transceiver to transmit the multiplexed acknowledgement bits and the uplink data on an uplink data channel.

10. The UE of claim 9, wherein the acknowledgement information is generated at each of the TTIs.

11. The UE of claim 9, wherein the controller is configured to generate a single reception result, when the UE receives more than one data TB on a downlink data channel, and wherein the controller is configured to represents the single reception result to indicate correct detection, if all of the data TBs were correctly detected, and to indicate incorrect detection, if at least one of the data TBs was incorrectly detected.

12. The UE of claim 9, wherein when the controller does not detect a data TB or a control channel releasing transmission of the downlink data channel in a TTI, the controller is configured to generate a single reception result indicating incorrect detection as the acknowledgement information.

13. The UE of claim 9, wherein when the acknowledgement information is transmitted on an uplink control channel, the controller is configured to generate the acknowledgement information by using bits indicating resources of the uplink control channel and bits indicating a constellation point of the uplink control channel.

14. The UE of claim 9, wherein the acknowledgement bits are encoded by Reed-Mueller (RM) encoding.

15. The UE of claim 9, wherein one of the state of reception results is represented as {NACK, any, any, any} and {NACK/DTX, any, any, any} for a first cell and a second cell of the two cells, respectively, or represented as {NACK, any, any} and {NACK/DTX, any, any} for the first cell and the second cell of the two cells, respectively by all acknowledgement information bits {0, 0, 0, 0}, if the UE is configured for reception of the downlink data channels from two cells and the number of the TTIs is three or four, and wherein the 'NACK' indicates 'Negative ACK', the 'DTX' indicates 'Discontinuous Transmission', and the 'any' indicates one of 'ACK', 'NACK' or 'DTX'.

16. The UE of claim 9, wherein one of the state of reception results is represented as {DTX, any, any, any} and {NACK/DTX, any, any, any} for a first cell and a second cell of the two cells, respectively, or represented as {DTX, any, any} and {NACK/DTX, any, any} for the first cell and the second cell of the two cells, respectively by all acknowledgement information bits {0, 0, 0, 0}, if the UE is configured for reception of the downlink data channels from two cells and the number of the TTIs is three or four, and wherein the 'NACK' indicates 'Negative ACK', the 'DTX' indicates 'Discontinuous Transmission', and the 'any' indicates one of 'ACK', 'NACK' or 'DTX'.

* * * * *